US012764658B2

(12) United States Patent
Tsai et al.

(10) Patent No.: US 12,764,658 B2
(45) Date of Patent: Oct. 13, 2026

(54) USER EQUIPMENT AND METHOD FOR POWER SAVING IN RRC INACTIVE OR RRC IDLE STATES

(71) Applicant: SHARP KABUSHIKI KAISHA, Sakai City (JP)

(72) Inventors: Hsin-Hsi Tsai, Taipei (TW); Mei-Ju Shih, Taipei (TW); Hung-Chen Chen, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 538 days.

(21) Appl. No.: 17/927,475

(22) PCT Filed: May 26, 2021

(86) PCT No.: PCT/CN2021/096110
§ 371 (c)(1),
(2) Date: Nov. 23, 2022

(87) PCT Pub. No.: WO2021/238993
PCT Pub. Date: Dec. 2, 2021

(65) Prior Publication Data
US 2023/0209464 A1 Jun. 29, 2023

Related U.S. Application Data

(60) Provisional application No. 63/030,228, filed on May 26, 2020.

(51) Int. Cl.
*H04W 52/02* (2009.01)
*H04W 76/27* (2018.01)
*H04W 72/23* (2023.01)

(52) U.S. Cl.
CPC ....... *H04W 52/0216* (2013.01); *H04W 76/27* (2018.02); *H04W 72/23* (2023.01)

(58) Field of Classification Search
CPC . H04W 52/0216; H04W 76/27; H04W 72/23; H04W 68/02; H04W 24/08; H04W 72/232; Y02D 30/70; H04L 5/0053
See application file for complete search history.

(56) References Cited

U.S. PATENT DOCUMENTS

2012/0122495 A1* 5/2012 Weng .................. H04W 68/025 455/458
2012/0314635 A1* 12/2012 Lee ....................... H04W 76/27 370/311

(Continued)

FOREIGN PATENT DOCUMENTS

| | | | |
|---|---|---|---|
| CN | 108781346 | A | 11/2018 |
| WO | 2020060890 | A1 | 3/2020 |
| WO | 2020063587 | A1 | 4/2020 |

OTHER PUBLICATIONS

3GPP TS 36.300 V16.1.0 (Mar. 2020), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

(Continued)

*Primary Examiner* — Khaled M Kassim
*Assistant Examiner* — Christopher A. Reyes
(74) *Attorney, Agent, or Firm* — ScienBiziP, P.C.

(57) ABSTRACT

A user equipment (UE) and a method for a power saving operation in one of a radio resource control (RRC)_INACTIVE state and an RRC_IDLE state are provided. The method includes receiving a first configuration from a base station (BS), the first configuration indicating a paging search space; receiving a second configuration from the BS, the second configuration indicating a first search space for monitoring a specific indication; monitoring a physical downlink control channel (PDCCH) in the first search space (Continued)

800 to detect the specific indication; and determining whether to monitor a paging occasion (PO) based on whether the specific indication is detected in the first search space, the PO being determined according to the paging search space.

12 Claims, 9 Drawing Sheets

(56) References Cited

U.S. PATENT DOCUMENTS

| | | | | |
|---|---|---|---|---|
| 2013/0044662 | A1* | 2/2013 | Kwon | H04L 1/1864 370/311 |
| 2013/0301499 | A1* | 11/2013 | Jain | H04J 3/1694 370/311 |
| 2018/0049175 | A1* | 2/2018 | Bagheri | H04L 5/0091 |
| 2018/0077643 | A1* | 3/2018 | Dinan | H04W 72/21 |
| 2018/0077644 | A1* | 3/2018 | Dinan | H04W 76/27 |
| 2018/0213452 | A1* | 7/2018 | Kim | H04L 5/0007 |
| 2018/0270756 | A1* | 9/2018 | Bhattad | H04W 76/27 |
| 2019/0053029 | A1* | 2/2019 | Agiwal | H04W 48/12 |
| 2019/0116552 | A1* | 4/2019 | Sebeni | H04W 72/23 |
| 2019/0174529 | A1* | 6/2019 | Tie | H04W 4/70 |
| 2019/0223145 | A1* | 7/2019 | Jung | H04W 76/27 |
| 2019/0239283 | A1* | 8/2019 | Kwak | H04W 36/0077 |
| 2019/0394749 | A1* | 12/2019 | Islam | H04W 72/23 |
| 2020/0092813 | A1* | 3/2020 | Kim | H04L 1/0072 |
| 2020/0154489 | A1* | 5/2020 | Zhou | H04W 74/0838 |
| 2020/0280971 | A1* | 9/2020 | Moon | H04W 74/0808 |
| 2021/0352615 | A1* | 11/2021 | Luo | H04W 68/00 |
| 2023/0209462 | A1* | 6/2023 | Tsai | H04W 52/0235 370/311 |
| 2023/0209463 | A1* | 6/2023 | Shih | H04W 52/0216 370/311 |
| 2023/0209464 | A1* | 6/2023 | Tsai | H04W 52/0216 370/311 |

OTHER PUBLICATIONS

3GPP TS 36.304 V16.0.0 (Mar. 2020), 3rd Generation Partnership Project; Technical Specification Group Radio Access Network; Evolved Universal Terrestrial Radio Access (E-UTRA); User Equipment (UE) procedures in idle mode (Release 16).

3GPP TS 38.300 V16.1.0 (Mar. 2020), 3rd Generation Partnership Project; Technical Specification Group Radio Access Network; NR; NR and NG-RAN Overall Description; Stage 2 (Release 16).

3GPP TS 38.304 V16.0.0 (Mar. 2020), 3rd Generation Partnership Project; Technical Specification Group Radio Access Network; NR; User Equipment (UE) procedures in Idle mode and RRC Inactive state (Release 16).

3GPP TS 38.212 V16.1.0 (Mar. 2020), 3rd Generation Partnership Project; Technical Specification Group Radio Access Network; NR; Multiplexing and channel coding (Release 16).

3GPP TS 38.213 V16.1.0 (Mar. 2020), 3rd Generation Partnership Project; Technical Specification Group Radio Access Network; NR; Physical layer procedures for control (Release 16).

3GPP TS 38.214 V16.0.0 (Dec. 2019), 3rd Generation Partnership Project; Technical Specification Group Radio Access Network; NR; Physical layer procedures for data (Release 16).

3GPP TS 38.331 V16.0.0 (Mar. 2020), 3rd Generation Partnership Project; Technical Specification Group Radio Access Network; NR; Radio Resource Control (RRC) protocol specification (Release 16).

Interdigital, Inc., "Discussion on Triggering of Power Mode Adaptation", R1-1813244, 3GPP TSG RAN WG1 Meeting #95, Spokane, USA, Nov. 12-16, 2018, sections 1-3.

ZTE: "Views on power saving enhancement", 3GPP Draft; R1-2003489, 3GPP TSG RAN WGI #101, e-Meeting, May 25-Jun. 5, 2020 (May 16, 2020).

VIVO: "Paging enhancement for power saving", 3GPP Draft; R2-1902285, 3GPP TSG-RAN WG2 Meeting #105, Athens, Greece, Feb. 25-Mar. 1, 2019 (Feb. 22, 2019).

Huawei et al: "UE power saving for paging", 3GPP Draft; R1-1907521, 3GPPTSG RANWGI Meeting#97, Reno, USA, May 13-May 17, 2019 (May 13, 2019).

Samsung, "PDCCH-based power saving signal/channel", R1-1906980, 3GPP TSG RAN WG1 #97, Reno, USA, May 13-17, 2019(May 3, 2019).

ZTE, "Views on power saving enhancement", R1-2000513, 3GPP TSG RAN WG1 #100, e-meeting, Feb. 24-Mar. 6, 2020(Feb. 15, 2020).

CATT, "Power saving signal/channel design and performance", R1-1910353, 3GPP TSG RAN WG1 Meeting #98Bis, Chongqing, China, Oct. 14-20, 2019(Oct. 5, 2019).

* cited by examiner

300

USER EQUIPMENT AND METHOD FOR POWER SAVING IN RRC INACTIVE OR RRC IDLE STATES

CROSS-REFERENCE TO RELATED APPLICATIONS

This application is the National Stage application of International Patent Application Serial No. PCT/CN2021/096110, filed on May 26, 2021, which claims the benefit of and priority to U.S. Provisional Patent Application Ser. No. 63/030,228, filed on May 26, 2020. The contents of all of the above-mentioned applications are hereby fully incorporated herein by reference for all purposes.

FIELD

The present disclosure is related to wireless communication and, more specifically, to a power saving operation in a radio resource control (RRC) INACTIVE state or an RRC IDLE state.

BACKGROUND

Various efforts have been made to improve different aspects of wireless communication for cellular wireless communication systems, such as fifth-generation (5G) New Radio (NR) by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a power saving operation in an RRC INACTIVE state or an RRC IDLE state.

According to an aspect of the present disclosure, a method performed by a UE for a power saving operation in one of an RRC_INACTIVE state and an RRC_IDLE state is provided. The method includes receiving a first configuration from a base station (BS), the first configuration indicating a paging search space; receiving a second configuration from the BS, the second configuration indicating a first search space for monitoring a specific indication; monitoring a physical downlink control channel (PDCCH) in the first search space to detect the specific indication; and determining whether to monitor a paging occasion (PO) based on whether the specific indication is detected in the first search space, the PO being determined according to the paging search space.

According to another aspect of the present disclosure, a UE for performing a power saving operation in one of an RRC_INACTIVE state and an RRC_IDLE state is provided. The UE includes at least one processor and at least one memory coupled to the at least one processor, the at least one memory storing one or more computer-executable instructions that, when executed by the at least one processor, causes the UE to perform operations including receiving a first configuration from a BS, the first configuration indicating a paging search space; receiving a second configuration from the BS, the second configuration indicating a first search space for monitoring a specific indication; monitoring a PDCCH in the first search space to detect the specific indication; and determining whether to monitor a PO based on whether the specific indication is detected in the first search space, the PO being determined according to the paging search space.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
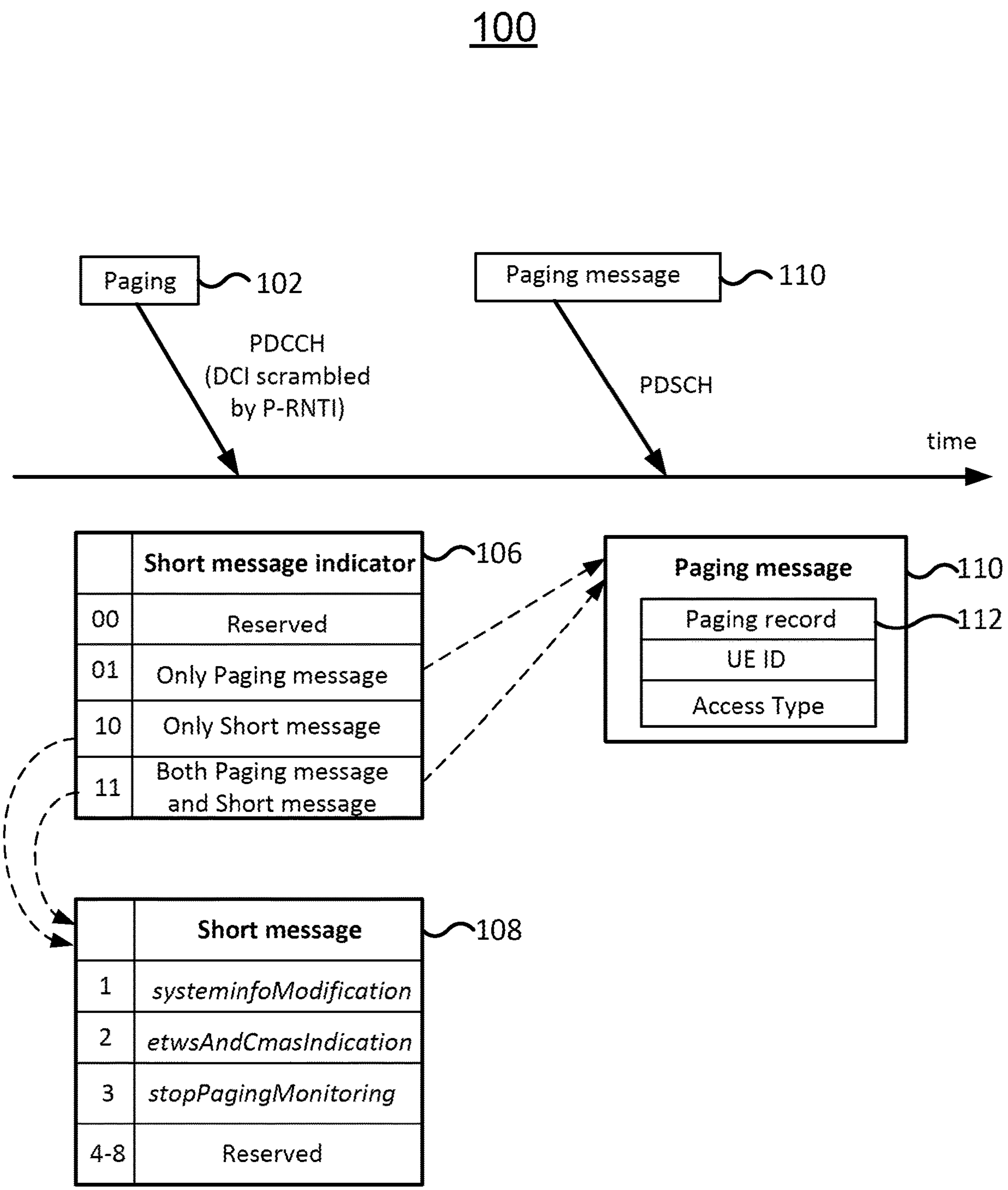
FIG. 1 illustrates a paging process according to an example implementation of the present disclosure.

Abbreviations used in this disclosure include:

| Abbreviation | Full name |
|---|---|
| 5GC | 5G Core |
| 5G-S-TMSI | 5G S-Temporary Mobile Subscriber Identity |
| AMF | Access and Mobility Management Function |
| AS | Access Stratum |
| BA | Bandwidth Adaptation |
| BCCH | Broadcast Control Channel |
| BS | Base Station |
| BWP | Bandwidth Part |
| CE | Control Element |
| CMAS | Commercial Mobile Alert Service |
| CN | Core Network |
| CORESET | Control Resource Set |
| CRC | Cyclic Redundancy Check |
| C-RNTI | Cell Radio Network Temporary Identifier |
| CSI-RS | Channel State Information Reference Signal |

| Abbreviation | Full name |
|---|---|
| DCI | Downlink Control Information |
| DCP | DCI with CRC scrambled by PS-RNTI |
| DL | Downlink |
| DRX | Discontinuous Reception |
| eMBB | Enhanced Mobile Broadband |
| eMTC | Enhanced Machine Type Communication |
| EPC | Evolved Packet Core |
| ETWS | Earthquake and Tsunami Warning System |
| EUTRA | Evolved Universal Terrestrial Radio Access |
| FDD | Frequency Division Duplexing |
| FR | Frequency Range |
| HARQ | Hybrid Automatic Repeat Request |
| ID | Identifier |
| IE | Information Element |
| I-RNTI | Inactive RNTI |
| LTE | Long Term Evolution |
| MAC | Medium Access Control |
| MCG | Master Cell Group |
| MIB | Master Information Block |
| MIMO | Multiple Input Multiple Output |
| MME | Mobility Management Entity |
| MO | (PDCCH) Monitoring Occasion |
| MSG | Message |
| MTC | Machine-Type Communications |
| NAS | Non-Access Stratum |
| NB-IoT | Narrowband Internet of Things |
| NG-RAN | Next-Generation Radio Access Network |
| NR | New Radio |
| NR-U | New Radio Unlicensed |
| NW | Network |
| OFDM | Orthogonal Frequency Division Multiplexing |
| PCell | Primary Cell |
| PCCH | Paging Control Channel |
| PDCCH | Physical Downlink Control Channel |
| PDCP | Packet Data Convergence Protocol |
| PDSCH | Physical Downlink Shared Channel |
| PDU | Protocol Data Unit |
| PEI | Paging Early Indication |
| PF | Paging Frame |
| PHY | Physical |
| PO | Paging Occasion |
| PRACH | Physical Random Access Channel |
| P-RNTI | Paging RNTI |
| PSCell | Primary Secondary Cell |
| PS-RNTI | Power Saving RNTI |
| PUCCH | Physical Uplink Control Channel |
| PUSCH | Physical Uplink Shared Channel |
| PWS | Public Warning System |
| QoS | Quality of Service |
| RA | Random Access |
| RACH | Random Access Channel |
| RAN | Radio Access Network |
| RAT | Radio Access Technology |
| Rel | Release |
| RLC | Radio Link Control |
| RMSI | Remaining Minimum System Information |
| RNA | RAN-based Notification Area |
| RNTI | Radio Network Temporary Identifier |
| RRC | Radio Resource Control |
| RRM | Radio Resource Management |
| RSRP | Reference Signal Received Power |
| RTT | Round Trip Time |
| SA | Stand Alone |
| SAP | Service Access Point |
| SCell | Secondary Cell |
| SCG | Secondary Cell Group |
| SDAP | Service Data Adaptation Protocol |
| SFN | System Frame Number |
| SI | System Information |
| SIB | System Information Block |
| SINR | Signal to Interference plus Noise Ratio |
| S-NSSAI | Single Network Slice Selection Assistance Information |
| SRB | Signaling Radio Bearer |
| SRS | Sounding Reference Signal |
| SSB | Synchronization Signal Block |
| S-TMSI | SAE-Temporary Mobile Subscriber Identity |
| TRP | Transmission/Reception Point |

| Abbreviation | Full name |
|---|---|
| TDD | Time Division Duplexing |
| TM | Transparent Mode |
| TS | Technical Specification |
| UE | User Equipment |
| UL | Uplink |
| URLLC | Ultra-Reliable and Low-Latency Communication |
| WUS | Wake Up Signal |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the so-disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (Pcell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (Scells). An SCG may refer to a group of serving cells associated with the Secondary Node (SN), including the SpCell and optionally one or more Scells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following disclosure may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Examples of some selected terms are provided as follows.

User Equipment (UE): The UE may be referred to as a PHY/MAC/RLC/PDCP/SDAP entity. The PHY/MAC/RLC/PDCP/SDAP entity may be referred to as the UE.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation the term Special Cell refers to the PCell of the MCG or the PSCell of the SCG depending on if the MAC entity is associated with the MCG or the SCG, respectively. Otherwise, the term Special Cell refers to the PCell. A Special Cell supports PUCCH transmission and contention-based Random Access, and is always activated.

Component Carrier (CC): The CC may be a PCell, PSCell, and/or SCell.

Network (NW), Radio Access Network (RAN), cell, camped cell, serving cell, base station, gNB, eNB, and ng-eNB may be used interchangeably in the present disclosure. In some implementations, some of these items may refer to the same network entity.

The disclosed mechanism may be applied to any RAT. The RAT may be (but is not limited to) NR, NR-U, LTE, E-UTRA connected to 5GC, LTE connected to 5GC, E-UTRA connected to EPC, and LTE connected to EPC.

The disclosed mechanism may be applied for UEs in public networks, or in private networks (e.g., non-public network (NPN), standalone NPN (SNPN), public network integrated NPN (PNI-NPN)).

The disclosed mechanism may be used for licensed spectrum and/or unlicensed spectrum.

System information (SI) may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB, power-saving-specific SIB). The UE may receive the SI either via broadcast or via unicast. In response to the UE's system information request, the UE may receive the requested SI either via broadcast or via unicast.

Dedicated (RRC) signaling may refer to (but is not limited to) RRC message(s). For example, such RRC messages may include RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration Complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message (e.g., UE Assistance Information NR message, UE Assistance Information EUTRA message), UE Capability Enquiry message, UE Capability Information message, UE Information Request message, and UE Information Response message.

An RRC_CONNECTED UE, RRC_INACTIVE UE, and RRC_IDLE UE may apply the disclosed implementations.

An RRC_CONNECTED UE may be configured with an active BWP with common search space configured to monitor system information or paging.

Generally, the disclosed mechanism may be applied for the PCell and the UE. In some implementations, the proposed mechanism may be applied for the PSCell and the UE.

DCI may refer to a PDCCH resource scrambled by (or addressed to) an RNTI. Alternatively, the implementations regarding DCI may be applied for a physical signal.

Determination of Paging Monitoring Occasions, as Specified in the 3GPP TS 38.304

The PF and PO for paging are determined by the following formulae:

SFN for the PF is determined by: (SFN+PF_offset) mod T=(T div N)*(UE_ID mod N)

Index (i_s), indicating the index of the PO is determined by: i_s=floor (UE_ID/N) mod Ns The PDCCH monitoring occasions for paging are determined according to pagingSearchSpace, as specified in TS 38.213 and firstPDCCH-MonitoringOccasionOfPO and nrofPDCCH-MonitoringOccasionPerSSB-InPO, if configured, as specified in TS 38.331. When SearchSpaceId=0 is configured for pagingSearchSpace, the PDCCH monitoring occasions for paging are the same as for RMSI, as defined in clause 13 in TS 38.213.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1, and X is the nrofPDCCH-MonitoringOccasionPerSSB-InPO, if configured, or is equal to 1 otherwise. The $[x*S+K]^{th}$ PDCCH monitoring occasion for paging in the PO corresponds to the $K^{th}$ transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.

NOTE 2: The PDCCH monitoring occasions for a PO can span multiple radio frames.

When SearchSpaceId other than 0 is configured for paging-SearchSpace, the PDCCH monitoring occasions for a PO can span multiple periods of the paging search space.

The following parameters are used for the calculation of PF and i_s above:

T: DRX cycle of the UE (T is determined by the shortest of the UE-specific DRX value(s), if configured by RRC and/or upper layers, and a default DRX value broadcast in system information. In RRC_IDLE state, if a UE-specific DRX is not configured by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset, as defined in TS 38.331. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI (for instance, when the UE has not yet registered onto the network), the UE shall use as default identity UE_ID=0 in the PF and i_s formulas above.

Paging Reception, as Specified in the 3GPP TS 38.331

The purpose of the paging procedure is to transmit paging information to a UE in RRC_IDLE or RRC_INACTIVE.

The network initiates the paging procedure by transmitting the Paging message at the UE's paging occasion, as specified in TS 38.304. The network may address multiple UEs within a Paging message by including one PagingRecord for each UE.

Table 1 illustrates a procedure performed by the UE for reception of the paging message.

TABLE 1

Upon receiving the Paging message, the UE shall:
1> if in RRC_IDLE, for each of the PagingRecord, if any, included in the Paging message:
2> if the ue-Identity included in the PagingRecord matches the UE identity allocated by upper layers:
3> forward the ue-Identity and accessType (if present) to the upper layers;
1> if in RRC_INACTIVE, for each of the PagingRecord, if any, included in the Paging message:
2> if the ue-Identity included in the PagingRecord matches the UE's stored fullI-RNTI:
3> if the UE is configured by upper layers with Access Identity 1:
4> initiate the RRC connection resumption procedure according to 5.3.13 with resumeCause set to mps-PriorityAccess;
3> else if the UE is configured by upper layers with Access Identity 2:
4> initiate the RRC connection resumption procedure according to 5.3.13 with resumeCause set to mcs-PriorilyAccess;
3> else if the UE is configured by upper layers with one or more Access Identities equal to 11-15:
4> initiate the RRC connection resumption procedure according to 5.3.13 with resumeCause set to highPriorityAccess;
3> else:
4> initiate the RRC connection resumption procedure according to 5.3.13 with resumeCause set to mt-Access;
2> else if the ue-Identity included in the PagingRecord matches the UE identity allocated by upper layers:
3> forward the ue-Identity to upper layers and accessType (if present) to the upper layers;
3> perform the actions upon going to RRC_IDLE as specified in 5.3.11 with release cause 'other'.

Short Message

Short messages can be transmitted on PDCCH using P-RNTI with or without an associated Paging message using the Short Message field in DCI format 10 (see TS 38.212).

Table 2 illustrates an example short message, where bit 1 is the most significant bit.

TABLE 2

| Bit | Short Message |
|---|---|
| 1 | systemInfoModification<br>If set to 1: indication of a BCCH modification other than SIB6, SIB7, and SIB8. |
| 2 | etwsAndCmasIndication<br>If set to 1: indication of an ETWS primary notification and/or an ETWS secondary notification and/or a CMAS notification. |

TABLE 2-continued

| Bit | Short Message |
|---|---|
| 3 | stopPagingMonitoring<br>If set to 1: stop monitoring PDCCH occasions(s) for paging in this PO. |
| 4-8 | Not used in this release of the specification, and shall be ignored by UE if received. |

Paging Message, as Specified in the 3GPP TS 38.331

The Paging message is used for the notification of one or more UEs.

Signaling radio bearer: N/A

RLC-SAP: TM

Logical channel: PCCH

Direction: Network to UE

Table 3 illustrates a data structure of an example paging message

TABLE 3

```
-- ASN1START
-- TAG-PAGING-START
Paging ::=                        SEQUENCE {
   pagingRecordList                        PagingRecordList
OPTIONAL, -- Need N
   lateNonCriticalExtension            OCTET STRING
OPTIONAL,
   nonCriticalExtension                  SEQUENCE{ }
OPTIONAL
}
PagingRecordList ::=              SEQUENCE (SIZE(1..maxNrofPageRec)) OF
PagingRecord
PagingRecord ::=                  SEQUENCE {
   ue-Identity                       PagingUE-Identity,
   accessType                           ENUMERATED {non3GPP}   OPTIONAL,
-- Need N
   ...
}
PagingUE-Identity ::=             CHOICE {
   ng-5G-S-TMSI                            NG-5G-S-TMSI,
   fullI-RNTI                           I-RNTI-Value,
   ...
}
-- TAG-PAGING-STOP
-- ASN1STOP
```

The field accessType in the PagingRecord may indicate whether the Paging message is originated due to the PDU sessions from the non-3GPP access.

DCI Scrambled by P-RNTI (which May be Referred to as Paging DCI), as Specified in the 3GPP TS 38.212

The following information is transmitted by means of the DCI format 1_0 with CRC scrambled by P-RNTI:

Short Messages Indicator—2 bits according to Table 7.3.1.2.1-1 in the 3GPP TS 38.212.

Short Messages—8 bits, according to Clause 6.5 of the 3GPP TS 38.331. If only the scheduling information for Paging is carried, this bit field is reserved.

Frequency domain resource assignment $$\lceil \log_2(N_{RB}^{DL,BWP}(N_{RB}^{DL,BWP}+1)/2 \rceil$$

bits. If only the short message is carried, this bit field is reserved.

$$N_{RB}^{DL,BWP}$$

is the size of CORESET 0.

Time domain resource assignment—4 bits as defined in Clause 5.1.2.1 of the 3GPP TS 38.214. If only the short message is carried, this bit field is reserved.

Virtual Resource Block (VRB)-to-PRB mapping—1 bit according to Table 7.3.1.2.2-5. If only the short message is carried, this bit field is reserved.

Modulation and coding scheme—5 bits as defined in Clause 5.1.3 of the 3GPP TS 38.214, using Table 5.1.3.1-1. If only the short message is carried, this bit field is reserved.

Transport Block (TB) scaling—2 bits as defined in Clause 5.1.3.2 of the 3GPP TS 38.214. If only the short message is carried, this bit field is reserved.

Reserved bits—8 bits for operation in a cell with shared spectrum channel access; otherwise, 6 bits.

Table 4 illustrates an example short message indicator included in the DCI scrambled by the P-RNTI.

TABLE 4

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 5 illustrates an example configuration for PDCCH monitoring occasions for paging (according to the paging search space), as specified in the 3GPP TS 38.331.

TABLE 5

```
PDCCH-ConfigCommon ::=        SEQUENCE {
  pagingSearchSpace       SearchSpaceId       OPTIONAL,   -- Need S
...
```

Power Saving Enhancement

User experience is key to 5G/NR success, not only in terms of experienced data rates and latency but also, importantly, UE power consumption. UE power-saving enhancements are therefore vital to the success of the 5G/NR. Several power-saving schemes have been discussed, including power-saving signal/DCI as enhancement to connected-mode DRX (cDRX), additional adaptations to maximum MIMO layer number, SCell dormancy behavior and cross-slot scheduling as enhancements to BWP framework, RRM relaxation as enhancements for idle/inactive-mode power consumption, and UE assistance information.

However, additional enhancements are required to address outstanding issues, namely idle/inactive-mode power consumption in NR Standalone (SA) deployments, considering both eMIBB UEs and Reduced Capability NR devices, connected-mode power consumption with FR2 (e.g., frequency above 6 GHz) deployments, and optimizing network utilization of UE assistance information.

Paging

Paging allows the network to reach a UE in an RRC_IDLE state or an RRC_INACTIVE state through a paging message. Paging may also allow the network to notify a UE in RRC_IDLE, RRC_INACTIVE, or RRC_CONNECTED state of a system information change and ETWS/CMAS indications through a short message. Both the paging message and the short message are addressed with P-RNTI on PDCCH. The paging message is transmitted on a PCCH, whereas the short message is transmitted on the PDCCH directly. A UE “in the RRC_IDLE state” is also referred to as a UE “in RRC_IDLE” in the present disclosure. Similarly, “in the RRC_INACTIVE state” is also referred to as “in RRC_INACTIVE”, and “in the RRC_CONNECTED state” is also referred to as “in RRC_CONNECTED”.

While in RRC_IDLE, the UE may monitor the paging channels for CN-initiated paging; while in RRC_INACTIVE, the UE may also monitor paging channels for RAN-initiated paging. The UE need not monitor paging channels continuously, however; paging DRX is defined where the UE in RRC_IDLE or RRC_INACTIVE is only required to monitor paging channels during one paging occasion (PO) per DRX cycle, which is specified in TS 38.304. The paging DRX cycles may be configured by the network as follows:

For CN-initiated paging, a default cycle may be broadcast in system information;

For CN-initiated paging, a UE-specific cycle may be configured via NAS signaling; and For RAN-initiated paging, a UE-specific cycle may be configured via RRC signaling.

The UE may use the shortest of the DRX cycles applicable. In one implementation, a UE in RRC_IDLE may use the shortest of the first two cycles related to CN-initiated paging, while a UE in RRC_INACTIVE may use the shortest of the three cycles above.

The POs of a UE are derived based on the UE ID, and therefore POs for CN-initiated paging may overlap with POs for RAN-initiated paging. The number of different POs in a DRX cycle may be configurable via the system information and a network may distribute UEs to those POs based on their UE IDs.

When in RRC_CONNECTED, the UE may monitor the paging channels in any PO indicated in the system information for SI change indication and PWS notification. In case of BA, a UE in RRC_CONNECTED may only monitor paging channels on the active BWP with a common search space configured.

DRX for Paging

The UE may use DRX in RRC_IDLE or RRC_INACTIVE in order to reduce power consumption. The UE may monitor one PO per DRX cycle. A PO may be a set of PDCCH monitoring occasions and may include multiple time units (e.g., slot, subframe, OFDM symbol, etc.) in which paging DCI may be transmitted, as specified in TS 38.213. One paging frame (PF) is one radio frame and may contain one or multiple PO(s) or a starting point of a PO.

In multi-beam operations, the UE assumes that the same paging message and the same short message are repeated in all transmitted beams, and thus the selection of the beam(s) for the reception of the paging message and the short message is up to UE implementation. The paging message is the same for both RAN-initiated paging and CN-initiated paging.

In one implementation, the UE may initiate an RRC connection resume procedure upon receiving a RAN-initiated paging. If the UE receives a CN-initiated paging in the RRC_INACTIVE state, the UE may move to the RRC_IDLE state and inform NAS.

Issue

Paging allows the NW to reach UEs through a paging message and notify UEs of system information change and/or ETWS/CMAS indications through a short message. FIG. 1 illustrates a paging process 100 according to an example implementation of the present disclosure. A UE may monitor the PDCCH to receive a paging 102 that is transmitted via a DCI scrambled by a P-RNTI (e.g., paging DCI/DCI format 1_0). When the UE receives the paging 102, the UE may check a short message indicator 106 included in the DCI to know if there is a short message 108 carried in the DCI and check if there is scheduling information for a paging message 110. An example of the bit values of the short message indicator 106 is illustrated in Table 2 disclosed previously. An example format of the short message 108 is illustrated in Table 4 disclosed previously. If the short message indicator 106 indicates there is a paging message 110, the UE may further receive the paging message 110 on a PDSCH based on the scheduling information indicated by the DCI. When the UE receives the paging message 110 while in RRC_IDLE/RRC_INACTIVE, the UE may check if a UE ID field included in the paging record 112 matches the UE ID, which may be allocated by the upper layer or may be the UE's stored RNTI. If the UE ID field included in the paging record 112 matches the UE ID, the UE knows the NW would like to reach the UE, and the UE may perform some behaviors accordingly.

Figure 2:
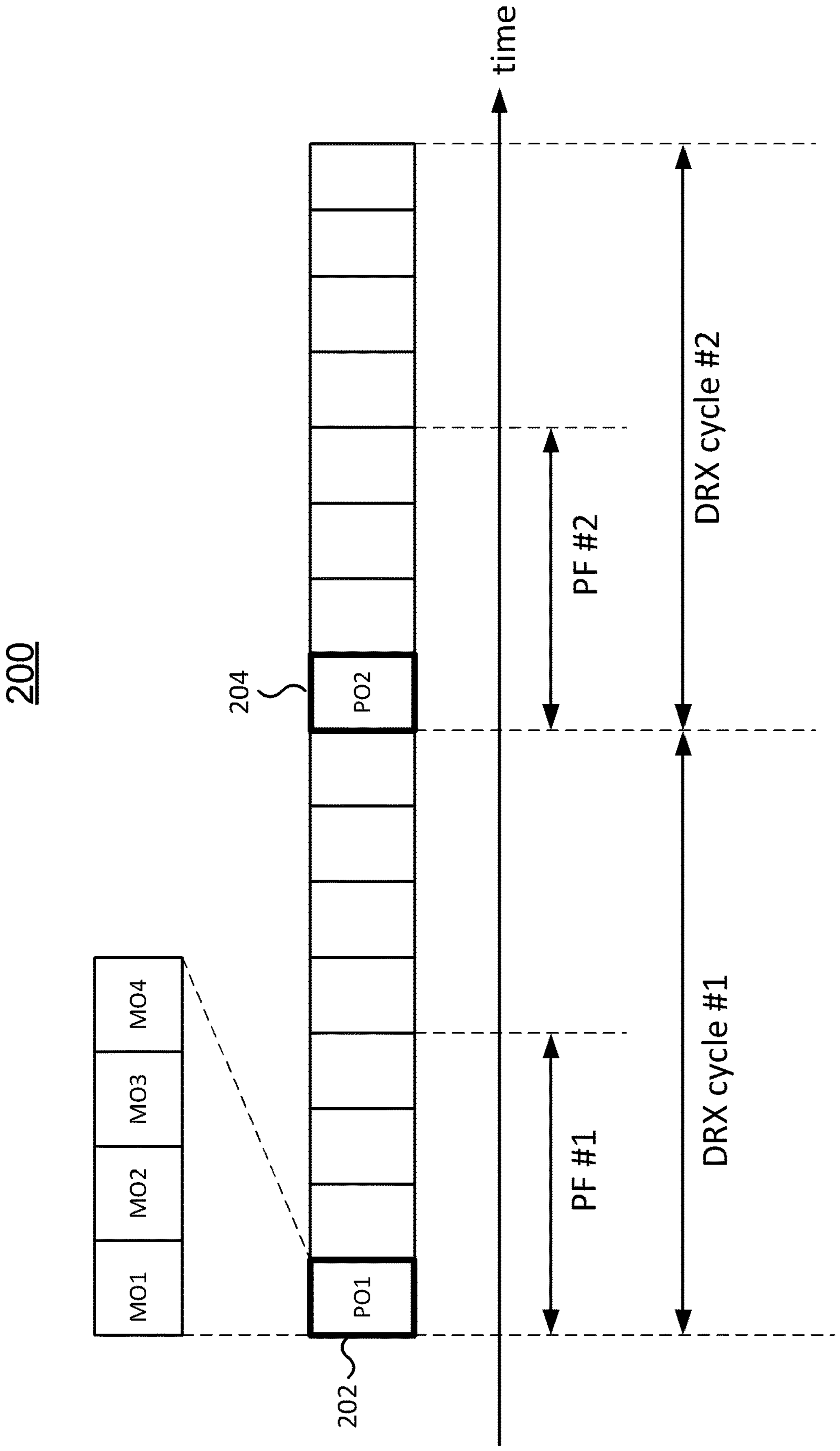
FIG. 2 illustrates a Discontinuous Reception (DRX) mechanism for paging monitoring according to an example implementation of the present disclosure.

In addition, in order to reduce power consumption, a DRX mechanism may be applied for paging monitoring (e.g., PDCCH monitoring for paging). The UE does not need to monitor the PDCCH continuously. FIG. 2 illustrates a DRX mechanism for paging monitoring 200 according to an example implementation of the present disclosure. The UE may be configured with a DRX cycle and several parameters for the determination of the PO. The UE may only monitor one PO per DRX cycle. In some cases (e.g., multi-beam operation, operation with shared spectrum channel access, etc.), the UE may monitor multiple PDCCH monitoring occasions (which is referred to as "MO" in the present disclosure) in one PO. As illustrated in FIG. 2, the UE monitors PO1 202 in DRX cycle #1 and monitors PO2 204 in DRX cycle #2. There is a PF #1 in the DRX cycle #1 and a PF #2 in the DRX cycle #2. The UE monitors four PDCCH monitoring occasions, including MO1, MO2, MO3, MO4, in PO1 202. In one implementation, a PO may include S consecutive PDCCH monitoring occasions, where Sis the number of actual transmitted SSBs determined according to ssb-PositionsInBurst in the SIB1. The $K^{th}$ PDCCH monitoring occasion for paging in the PO corresponds to the $K^{th}$ transmitted SSB, where K is an integer. In one implementation, a configuration related to MO for paging may include at least one of the following IEs:pagingSearchSpace, firstPDCCH-MonitoringOccasionOfPO, and nrofPDCCH-MonirotingOccasionPerSSB-InPO.

However, even though the UE only needs to monitor the PDCCH monitoring occasions configured by the NW, there is still some unnecessary PDCCH monitoring for paging (e.g., on paging occasion). For instance, the UE should monitor each PO (and/or the corresponding MOs within the PO) periodically to attempt to receive possible paging. However, the paging for the UE may not be regularly transmitted. For example, the paging may only be transmitted once in a long time period. Based on the current DRX mechanism, the UE will waste power to monitor the POs in cases that there is no paging and/or there is a paging but not indicated for the UE. To be more specific, the UE may waste power receiving the corresponding paging message indicated by the paging DCI, where the UE ID field included in the paging message does not match the UE ID, which may be a false alarm. Implementations are disclosed below to reduce the unnecessary PDCCH monitoring for paging (e.g., on paging occasion).

Figure 3:
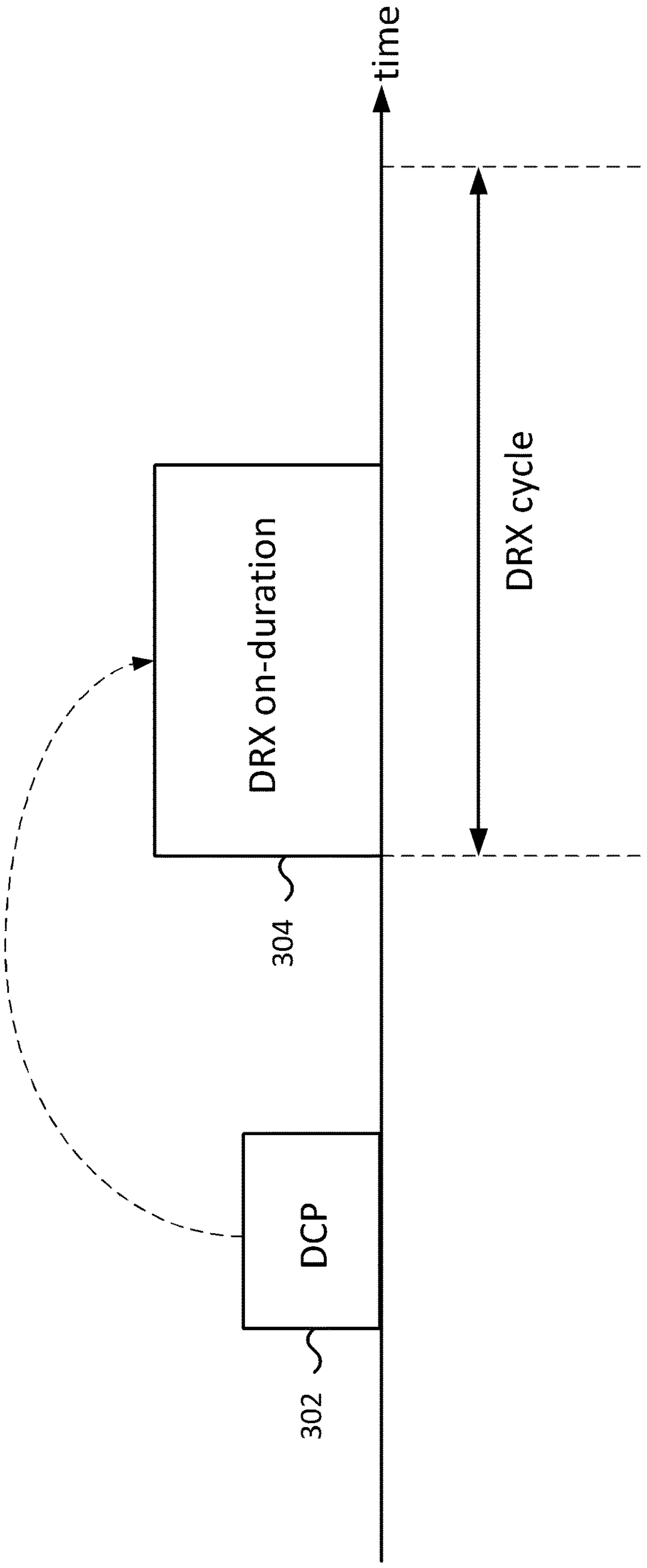
FIG. 3 illustrates a power saving scheme adopting a Downlink Control Information (DCI) with Cyclic Redundance Check (CRC) scrambled by Power Saving Radio Network Temporary Identifier (PS-RNTI) (or DCP) according to an example implementation of the present disclosure.

In NR, a power saving mechanism for RRC_CONNECTED was introduced (in power saving Work Item). The power saving mechanism introduced a new indication, which is DCI with CRC scrambled by PS-RNTI (DCP). FIG. 3 illustrates a power saving scheme 300 adopting a DCP according to an example implementation of the present disclosure. The DCP 302 is used to indicate whether the UE is required to monitor the PDCCH during the next occurrence of the DRX on-duration 304 within a DRX cycle. If the UE does not detect a DCP 302 on the active BWP, the UE does not monitor the PDCCH during the next occurrence of the DRX on-duration 304, unless the UE is explicitly configured to do so in that case.

The DCP is a specific DL signal for (dynamically) controlling the UE behaviors on PDCCH monitoring. The benefit of the DCP is to reduce unnecessary PDCCH monitoring. However, the DCP is designed for connected mode DRX (C-DRX), which is only used for reducing the PDCCH monitoring in RRC_CONNECTED but not used for reducing PDCCH monitoring for paging (e.g., on paging occasion) in RRC_IDLE/RRC_INACTIVE.

As a consequence, in NR, a new signal/indication (e.g., paging early indication) is needed for reducing unnecessary PDCCH monitoring for paging (e.g., on paging occasion) in RRC_IDLE/RRC_INACTIVE. Implementations of the new signal/indication (e.g., PEI) are disclosed below.

New Signaling/Indication (e.g., Paging Early Indication (PEI))

In NR, a new signaling/indication (e.g., PEI) may be needed for reducing unnecessary PDCCH monitoring for paging. The new signaling/indication may not be the DCP in NR and/or the WUS in LTE. The main function of the new signaling/indication (e.g., PEI) may be used to inform a UE when the UE can skip the configured PDCCH monitoring occasions for paging (e.g., the UE does not need to monitor the PDCCH for paging). In one implementation, the new signaling/indication (e.g., PEI) may indicate to the UE to skip monitoring one or more upcoming POs, where each PO may include one or more PDCCH monitoring occasions. On the other hand, the main function of the new signaling/indication (e.g., PEI) may be used to inform the UE when the UE should wake up to monitor the configured PDCCH monitoring occasions for paging (e.g., the UE should monitor the PDCCH for paging). In one implementation, the new signaling/indication (e.g., PEI) may indicate to the UE to monitor one or more upcoming POs, where each PO may include one or more PDCCH monitoring occasions. In one implementation, the new signaling/indication (e.g., PEI) may be combined and implemented as a single specific indication. The UE may determine whether to monitor one or more POs based on the new signaling/indication (e.g., PEI) received from a BS.

Implementations in the present disclosure address issues including:

- How to configure the new signaling/indication (e.g., PEI).
- When the UE should monitor the new signaling/indication (e.g., PEI).
- What information could be included in the new signaling/indication (e.g., PEI).
- UE behaviors upon receiving the new signaling/indication (e.g., PEI).
- How to increase the reliability of the new signaling/indication (e.g., PEI).
- How to handle the case if the new signaling/indication (e.g., PEI) collides with other resources.
- How to handle the case if the UE misses the new signaling/indication (e.g., PEI).
- How to avoid monitoring the new signaling/indication (e.g., PEI) too frequently.
- Fallback mechanism for the new signaling/indication (e.g., PEI),
- UE capability/UE assistance information for the new signaling/indication (e.g., PEI).

New Signaling/Indication (e.g., PEI) Configuration

The new signaling/indication (e.g., PEI) may be a cell-specific signaling, a UE group-specific signaling, and/or a UE-specific signaling. In one implementation, one new signaling/indication (e.g., PEI) may be indicated to all UEs in a cell. In one implementation, one new signaling/indication (e.g., PEI) may be indicated to a group of UEs in a cell. In one implementation, one new signaling/indication (e.g., PEI) may be indicated to a specific UE. In one implementation, the new signaling/indication (e.g., PEI) configuration (and/or parameters) may be configured by RAN, NAS, or core network (CN). For example, the new signaling/indication (e.g., PEI) configuration (and/or parameters) may be the RAN-level (e.g., RRC layer, MAC layer, PHY layer) signaling or NAS-level (e.g., NAS layer) signaling. If the new signaling/indication (e.g., PEI) configuration (and/or parameters) is the RAN-level signaling, it may be configured to the UE by the serving cell (or gNB or eNB). If the new signaling/indication (e.g., PEI) configuration (and/or parameter) is the NAS-level signaling, it may be configured to the UE by the CN (e.g., EPC, 5GC, especially MME of EPC, especially AMF of 5GC).

In one implementation, the new signaling/indication (e.g., PEI) is a cell-specific signaling. The monitoring occasion (e.g., search space and/or associated control resource set) may be a common monitoring occasion (e.g., common search space and/or common resource control set) for all the UEs in the same cell.

In one implementation, the new signaling/indication (e.g., PEI) is a UE group-specific signaling. The new signaling/indication (e.g., PEI), which is UE group-specific, may indicate the UE group information. The UE may be configured with one or multiple monitoring occasions (e.g., search spaces and/or associated control resource sets) for the UE group(s). Each monitoring occasion (e.g., search space and/or associated control resource set) may be associated with a UE group. Alternatively, a UE may have (or be configured with) different RNTIs for monitoring different UE groups.

The NW may indicate to the UE to monitor which monitoring occasion(s) (for UE group(s)) based on some criteria. Alternatively, the UE may select one or more of the UE groups to monitor based on some criteria.

In one implementation, the new signaling/indication (e.g., PEI) may indicate a UE group, such as a group ID. The UE may determine whether to monitor a PO according to whether the UE is associated with the UE group.

In one implementation, a UE group may be formed/determined based on at least one of the following elements/fields/information:

- UE ID. For example, the NW may equally distribute the UEs to several UE groups based on their UE ID.
- UE service type/characteristic (for example, based on QoS or eMBB/URLLC/eMTC UE).
- UE's required/supported slice (e.g., network slice, RAN slice) (for example, based on the UE's registered/allowed/supported S-NSSAI(s), where an S-NSSAI may be associated with one slice).
- UE capability. For example, the reduced capability UE may be associated with a specific UE group.
- UE assistance information (for example, some UE's preferences or a combination of some UE assistance information). The UE assistance information may be provided by the UE to the BS.
- Paging probability. The paging probability information may be negotiated between the UE and the NW (e.g., RAN and/or CN, 5GC) via RRC signaling and/or NAS signaling.
- Frequency range (e.g., FR1/FR2).
- UE's RRC state (e.g., RRC_IDLE, RRC_INACTIVE, RRC_CONNECTED).
- UE's channel condition, e.g., based on a measurement result of SSB/CSI-RS (via RSRP and/or SINR).
- UE's area. For example, the UE may know its area based on some geographic information.

In one implementation, the new signaling/indication (e.g., PEI) is a UE-specific signaling. The UE may be configured with one or multiple monitoring occasions (e.g., search space and/or associated control resource set).

In one implementation, the UE may monitor the PDCCH for the new signaling/indication (e.g., PEI) based on a specific RNTI (e.g., UE-specific RNTI).

The new signaling/indication (e.g., PEI) configuration (and/or the corresponding parameters) may be provided in system information (e.g., SIB 1, SIB 2, etc.) and/or in dedicated RRC configuration (e.g., via RRC reconfiguration, via RRC release (with/without suspend configuration), etc.), but is not limited thereto.

The UE may monitor the new signaling/indication (e.g., PEI) based on a cell-specific RNTI, a group-specific RNTI, and/or a UE-specific RNTI, such as P-RNTI, I-RNTI, etc. In one implementation, a new RNTI may be introduced for the new signaling/indication (e.g., PEI) monitoring. The new RNTI may be configured via system information and/or dedicated RRC configuration (e.g., via RRC reconfiguration, via RRC release (with/without suspend configuration), a fixed value, and/or etc.).

It is noted that the new signaling/indication (e.g., PEI) may be transmitted via DCI, MAC CE, RRC signaling, system information, and/or NAS signaling.

The new signaling/indication (e.g., PEI) configuration may include at least one of the following IEs/parameters/fields/information:

- Search space/CORESET/BWP of the new signaling/indication (e.g., PEI).

The UE may be configured with a specific search space/CORESET/BWP used for the new signaling/indication (e.g., PEI) monitoring. The new signaling/indication (e.g., PEI) may be transmitted on the specific search space/CORESET/BWP.

The search space of the new signaling/indication (e.g., PEI) may reuse (or be associated with) a specific search space (e.g., an existing search space in R-15/R-16), such as the paging search space. In one implementation, the new signaling/indication (e.g., PEI) may be transmitted on (or before) the paging monitoring occasions (e.g., PO). Alternatively, the specific search space/CORESET/BWP may be a specific search space/CORESET/BWP used for receiving a specific PDCCH/DCI (e.g., a DL signaling for data transmission in RRC_INACTIVE). In one implementation, the BWP may be an initial/default BWP. In one implementation, the BWP may be a specific BWP configured for the new signaling/indication (e.g., PEI) monitoring. In one implementation, the BWP may be a specific BWP configured for PDCCH monitoring in RRC_IDLE/RRC_INACTIVE. If a specific BWP is configured for the new signaling/indication (e.g., PEI), the UE may need to switch its active BWP to the specific BWP on a specific timing (e.g., before the timing for monitoring new signaling/indication (e.g., PEI)). The UE may need to switch back to the initial/default BWP from the specific BWP after the monitoring of the new signaling/indication (e.g., PEI) has been done.

Offset of the New Signaling/Indication (e.g., PEI)

The offset may be a time gap between the new signaling/indication (e.g., PEI) and the (starting position of) PO, PDCCH monitoring occasion for paging, PF, and/or DRX cycle, etc. The UE may monitor the new signaling/indication (e.g., PEI) an offset before (each of) the PO, PDCCH monitoring occasion for paging, PF, and/or DRX cycle. The value of the offset may be in a time unit of slot, symbol, subframe, radio frame, millisecond (ms), etc. The value of the offset may be zero.

Starting Position (Point) of the New Signaling/Indication (e.g., PEI)

The starting position of the new signaling/indication (e.g., PEI) may be a time location/offset for starting to monitor the new signaling/indication (e.g., PEI) on each search space, PO, PDCCH monitoring occasion for paging, PF, and/or DRX cycle. The value of the offset could be a time unit, e.g., slot, symbol, subframe, radio frame, ms, etc. The value of the offset could be zero.

Duration of the New Signaling/Indication (e.g., PEI)

The duration may be a time duration in which the UE should continue monitoring the new signaling/indication (e.g., PEI).

In one implementation, a timer may be configured for the UE to control how long the UE should monitor the new signaling/indication (e.g., PEI). The value of the timer may be in a time unit of slot, symbol, subframe, radio frame, ms, etc. The value of the timer may be infinity. If the timer is configured as infinity, the UE should monitor the new signaling/indication (e.g., PEI) on each monitoring occasion of the new signaling/indication (e.g., PEI).

While the timer is running, the UE may need to monitor the new signaling/indication (e.g., PEI) on each monitoring occasion of the new signaling/indication (e.g., PEI).

The timer may be (re-)started when the UE receives the new signaling/indication (e.g., PEI) configuration, the new signaling/indication (e.g., PEI), paging, a DL signaling in RRC_IDLE/RRC_INACTIVE, short message, system information, etc.

The timer may be stopped when the UE enters the RRC_CONNECTED state. The timer may be stopped when the UE receives the new signaling/indication (e.g., PEI) configuration, new signaling/indication (e.g., PEI), paging DCI, paging message, a DL signaling in RRC_IDLE/RRC_INACTIVE, short message, system information, etc. or when the UE terminates the power saving operation.

When the timer expires (or is not running), the UE may stop monitoring the new signaling/indication (e.g., PEI). When the timer expires, the UE may need to monitor each PO.

In one implementation, the duration may be associated with the number of POs, PDCCH monitoring occasions for paging, PFs, and/or DRX cycles. The UE may maintain a counter. The initial value of the counter may be set as the number of POs, PDCCH monitoring occasions for paging, PFs, and/or DRX cycles. The UE may decrease the counter by one if the UE monitors a new signaling/indication (e.g., PEI) (successfully) once. If the counter is not zero, the UE may need to monitor the new signaling/indication (e.g., PEI) on its monitoring occasions. If the counter reaches zero, the UE may not monitor the new signaling/indication (e.g., PEI) on its monitoring occasions and the UE may need to monitor each PO. If the counter reaches to zero, the UE may terminate/exit power saving operation.

The counter may be reset (to its initial value) when the UE receives the new signaling/indication (e.g., PEI) configuration, paging DCI, paging message, a DL signaling in RRC_IDLE/RRC_INACTIVE, short message, system information, etc.

The counter may be reset once for a period of time. How frequently the counter should be reset may be configured by the NW.

The Number of the New Signaling/Indication (e.g., PEI) in a Duration

In one implementation, the UE may need to monitor multiple new signaling/indications (e.g., PEI) in a duration, where the duration may be a duration of the new signaling/indication (e.g., PEI), PO, PDCCH monitoring occasion for paging, PF, and/or DRX cycle. In one implementation, the NW may transmit/repeat the same new signaling/indication (e.g., PEI) for a number of times in the duration (e.g., the content of the multiple new signaling/indication (e.g., PEI) may be the same). The number may be associated with the number of actual transmitted SSBs (e.g., determined according to ssb-PositionsInBurst in the SIB1).

Periodicity of the New Signaling/Indication (e.g., PEI)

The periodicity may be a time gap between a new signaling/indication (e.g., PEI) monitoring occasion and the next new signaling/indication (e.g., PEI) monitoring occasion. The periodicity may be in a time unit of slot, symbol, subframe, radio frame, ms, etc. The unit of the periodicity may be associated with PO, PDCCH monitoring occasion for paging, PF, and/or DRX cycle.

New Signaling/Indication (e.g., PEI) Functionalities

The New Signaling/Indication (e.g., PEI) May Indicate to the UE to Skip Monitoring The PDCCH for Paging (e.g., on a Paging Occasion).

In one implementation, the UE may determine whether to apply the function of the new signaling/indication (e.g., PEI) (e.g., to skip monitoring the PDCCH for paging on a paging occasion) based on whether the UE successfully receives/detects/decodes the new signaling/indication (e.g., PEI) on the monitoring occasion of the new signaling/indication (e.g., PEI). For example, if the UE successfully receives/detects/decodes the new signaling/indication (e.g., PEI) on the monitoring occasion of the new signaling/indication (e.g., PEI), the UE may skip monitoring the PDCCH for paging on a paging occasion. In contrast, the UE may not skip the monitoring the PDCCH for paging on a paging occasion if the UE does not successfully receive/detect/decode the new signaling/indication (e.g., PEI) on the monitoring occasion of the new signaling/indication (e.g., PEI).

In one implementation, the UE may determine whether to apply the function of the new signaling/indication (e.g., PEI) (e.g., to skip monitoring the PDCCH for paging on a paging occasion) based on an instruction indicated in the new signaling/indication (e.g., PEI). For example, the instruction may include a value or a bit that explicitly indicates whether the UE skips monitoring a PO. For example, if the value is a first value (e.g., '0'), the UE may need to monitor the PDCCH for paging on a paging occasion, whereas if the value is a second value (e.g., '1'), the UE may skip monitoring PDCCH for paging on a paging occasion. For example, if the UE satisfies a specific criterion by considering the instruction indicated in the new signaling/indication (e.g., PEI), the UE may skip monitoring the PDCCH for paging on a paging occasion. In one implementation, the instruction in the new signaling/indication (e.g., PEI) may be a Boolean indicator. If the UE receives the new signaling/indication (e.g., PEI) including the indicator '1', or if the UE receives the new signaling/indication (e.g., PEI) without the indicator, the UE may apply the function of the new signaling/indication (e.g., PEI). If the UE receives the new signaling/indication (e.g., PEI) with the indicator '0', the UE may not apply the function of the new signaling/indication (e.g., PEI).

In one implementation, if the UE does not successfully receive/detect/decode the new signaling/indication (e.g., PEI) on the monitoring occasion of the new signaling/indication (e.g., PEI), the UE may adopt a default action, which may be specified in the TS and/or configured by the NW. The default action may be monitoring the PDCCH for paging on a paging occasion or skipping monitoring the PO.

In one implementation, if the UE does not successfully receive/detect/decode the new signaling/indication (e.g., PEI) on the monitoring occasion of the new signaling/indication (e.g., PEI), the UE may not skip monitoring the PDCCH for paging on a (upcoming or next) paging occasion. The UE may need to monitor the PDCCH for paging on a paging occasion right after this monitoring occasion of the new signaling/indication (e.g., PEI).

In one implementation, if the UE does not monitor the new signaling/indication (e.g., PEI) on the monitoring occasion of the new signaling/indication (e.g., PEI) (e.g., when the monitoring occasion collides with another UL/DL resource or monitoring occasion (e.g., paging occasion, PRACH), measurement gap, etc.), the UE may not monitor the new signaling/indication (e.g., PEI) on the monitoring occasion of the new signaling/indication (e.g., PEI). Afterwards, the UE may not skip monitoring the PDCCH for paging on a (upcoming or next) paging occasion. The UE may need to monitor the PDCCH for paging on a paging occasion right after this monitoring occasion of the new signaling/indication (e.g., PEI).

In one implementation, if the monitoring occasion of the new signaling/indication (e.g., PEI) collides with another UL/DL resource or monitoring occasion (e.g., paging occasion, PRACH), measurement gap, etc., the UE may prioritize the new signaling/indication (e.g., PEI). The UE may monitor the new signaling/indication (e.g., PEI) and may not perform the transmission/reception on the other UL/DL resource. In one implementation, the UE may prioritize the monitoring occasion, channel, UL/DL resource based on a specific rule and/or the priority defined in the TS.

In one implementation, if the UE does not monitor the new signaling/indication (e.g., PEI) on the monitoring occasion of the new signaling/indication (e.g., PEI) (e.g., when the monitoring occasion collides with another UL/DL resource or monitoring occasion (e.g., paging occasion, PRACH), measurement gap, etc.), the UE may not monitor the new signaling/indication (e.g., PEI) on the monitoring occasion of the new signaling/indication (e.g., PEI). Then the UE may adopt a default action, which may be specified in the TS and/or configured by the NW. The default action may be monitoring the PDCCH for paging on a paging occasion or skipping monitoring the PO.

The UL resource may be a PRACH resource, PUCCH resource, PUSCH resource, SRS, etc.

The DL resource may be SSB, CSI-RS, PDSCH, PO, PDCCH monitoring occasion for paging, etc.

In one implementation, the default action may be configured via NAS signaling.

In one implementation, the default action may be configured via an RRC configuration (e.g., a configuration for the new signaling/indication (e.g., PEI)).

In one implementation, the default action may be configured via the system information.

In one implementation, the default action may be carried in a short message and/or a paging message. For example, the default action may be indicated to the UE via an indicator (e.g., one bit of the bitmap) in the short message. If the indicator indicates a first value (e.g., the bit is set to '1'), the UE may apply the default action. If the indicator indicates a second value (the bit is set to '0'), the UE may not apply the default action. For another example, the default action may be indicated to the UE via an indicator (e.g., one bit) or parameters in the paging message. If the indicator indicates a first value (e.g., the bit is set to '1') and/or parameters associated for the default action are included in the paging message, where the indicator and/or parameters are associated with (or included in) the paging record including the UE ID, the UE may apply the default action. If the indicator indicates a second value (e.g., the bit is set to '0') and/or parameters associated with the default action are not included in the paging message, where the indicator and/or parameters are associated with (or included in) the paging record including the UE ID, the UE may apply the default action.

In one implementation, the UE may monitor the new signaling/indication (e.g., PEI) when the UE is performing a specific procedure (or initiates the specific procedure). In one implementation, the UE may not monitor the new signaling/indication (e.g., PEI) when the UE is performing the specific procedure (or initiates the specific procedure).

The specific procedure may be an RA procedure, RRC connection resume procedure, RRC connection establishment procedure, RRC connection re-establishment procedure, cell (re-)selection procedure, RNA update (e.g., T380 expires or triggered upon reception of SIB1), tracking area update, and/or etc.

In one implementation, when the UE is in the RRC_CONNECTED state, the UE may not monitor the new signaling/indication (e.g., PEI) on the monitoring occasion of the new signaling/indication (e.g., PEI).

The New Signaling/Indication (e.g., PEI) May Indicate to the UE to Wake Up to Monitor the PDCCH for Paging (e.g., on a Paging Occasion).

In one implementation, the UE may determine whether to apply the function of the new signaling/indication (e.g., PEI), e.g., to wake up to monitor the PDCCH for paging on a paging occasion, based on whether the UE successfully receives/detects/decodes the new signaling/indication (e.g., PEI) on the monitoring occasion of the new signaling/indication (e.g., PEI). For example, if the UE successfully receives/detects/decodes the new signaling/indication (e.g., PEI) on the monitoring occasion of the new signaling/indication (e.g., PEI), the UE may wake up to monitor the PDCCH for paging on a paging occasion. In contrast, the UE may not wake up to monitor the PDCCH for paging on a paging occasion if the UE does not successfully receive/detect/decode the new signaling/indication (e.g., PEI) on the monitoring occasion of the new signaling/indication (e.g., PEI).

In one implementation, the UE may determine whether to apply the function of the new signaling/indication (e.g., PEI), e.g., wake up to monitor the PDCCH for paging on a paging occasion, based on an instruction indicated in the new signaling/indication (e.g., PEI). For example, the instruction may include a value or a bit that explicitly indicates whether the UE wakes up or not. For example, if the value is a first value (e.g., '1'), the UE may need to wake up to monitor the PDCCH for paging on a paging occasion, whereas if the value is a second value (e.g., '0'), the UE may not wake up and may not monitor PDCCH for paging on a paging occasion. In one implementation, the instruction in the new signaling/indication (e.g., PEI) may be a Boolean indicator. If the UE receives the new signaling/indication (e.g., PEI) including the indicator '1', or if the UE receives the new signaling/indication (e.g., PEI) without the indicator, the UE may apply the function of the new signaling/indication (e.g., PEI). If the UE receives the new signaling/indication (e.g., PEI) with the indicator '0', the UE may not apply the function of the new signaling/indication (e.g., PEI).

In one implementation, if the UE does not successfully receive/detect/decode the new signaling/indication (e.g., PEI) on the monitoring occasion of the new signaling/indication (e.g., PEI), the UE may adopt a default action, which may be specified in the TS and/or configured by the NW. The default action may be to wake up to monitor the PDCCH for paging (e.g., on a paging occasion) or not to wake up.

In one implementation, if the UE does not successfully receive/detect/decode the new signaling/indication (e.g., PEI) on the monitoring occasion of the new signaling/indication (e.g., PEI), the UE may wake up and monitor the upcoming (or next) PDCCH monitoring occasion(s) for paging. Alternatively, if the UE does not successfully receive/detect/decode the new signaling/indication (e.g., PEI) on the monitoring occasion of the new signaling/indication (e.g., PEI), the UE may wake up at the beginning of the upcoming (or next) PDCCH monitoring occasion for paging. The UE may still sleep during the gap between the end of the new signaling/indication (e.g., PEI) duration and the beginning of the PDCCH monitoring occasion for paging.

In one implementation, if the UE does not monitor the new signaling/indication (e.g., PEI) on the monitoring occasion of the new signaling/indication (e.g., PEI), (e.g., when the monitoring occasion collides with another UL/DL resource or monitoring occasion (e.g., paging occasion, PRACH), measurement gap, etc.), the UE may wake up and monitor the upcoming or next PDCCH monitoring occasion for paging. Alternatively, if the UE does not monitor the new signaling/indication (e.g., PEI) on the monitoring occasion of the new signaling/indication (e.g., PEI), (e.g., when the monitoring occasion collides with another UL/DL resource or monitoring occasion (e.g., paging occasion, PRACH), measurement gap, etc.), the UE may wake up at the beginning of the upcoming or next PDCCH monitoring occasion for paging. The UE may still sleep during the gap between the end of the new signaling/indication (e.g., PEI) duration and the beginning of the PDCCH monitoring occasion for paging.

Figure 4:
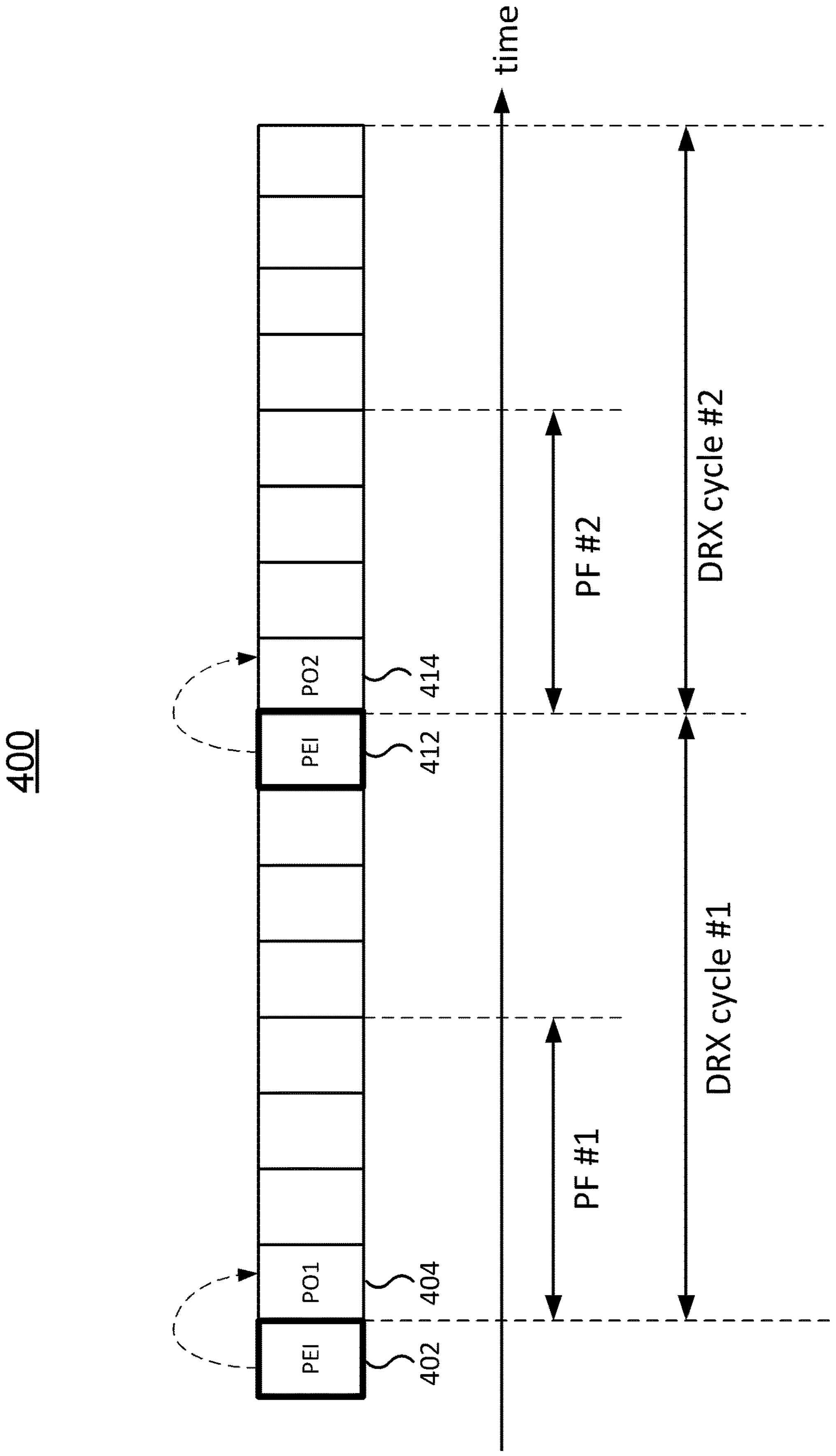
FIG. 4 illustrates a timing diagram of a new signaling/indication (e.g., Paging Early Indication (PEI)) associated with one Paging Occasion (PO)/Paging Frame (PF)/DRX cycle according to an example implementation of the present disclosure.

Association Between the New Signaling/Indication (e.g., PEI) and One or Multiple PO, PDCCH Monitoring Occasion for Paging, PF, and/or DRX Cycle In one implementation, the instruction of one new signaling/indication (e.g., PEI) may be applied to one PO, PDCCH monitoring occasion for paging, PF, and/or DRX cycle. In one implementation, the UE may only apply the instruction of one new signaling/indication (e.g., PEI) for the subsequent (or next) PO, PDCCH monitoring occasion for paging, PF, and/or DRX cycle. FIG. 4 illustrates a timing diagram 400 of a new signaling/indication (e.g., PEI) associated with one PO/PF/DRX cycle according to an example implementation of the present disclosure. PEI 402 is associated with PO1 404 (or PF #1, or DRX cycle #1). The UE may apply the instruction of the PEI 402 for the PO1 404 (or PF #1, or DRX cycle #1). Similarly, PEI 412 is applied to PO2 414 (or PF #2, or DRX cycle #2). The UE may apply the instruction of the PEI 412 for the PO2 414 (or PF #2, or DRX cycle #2).

Figure 5:
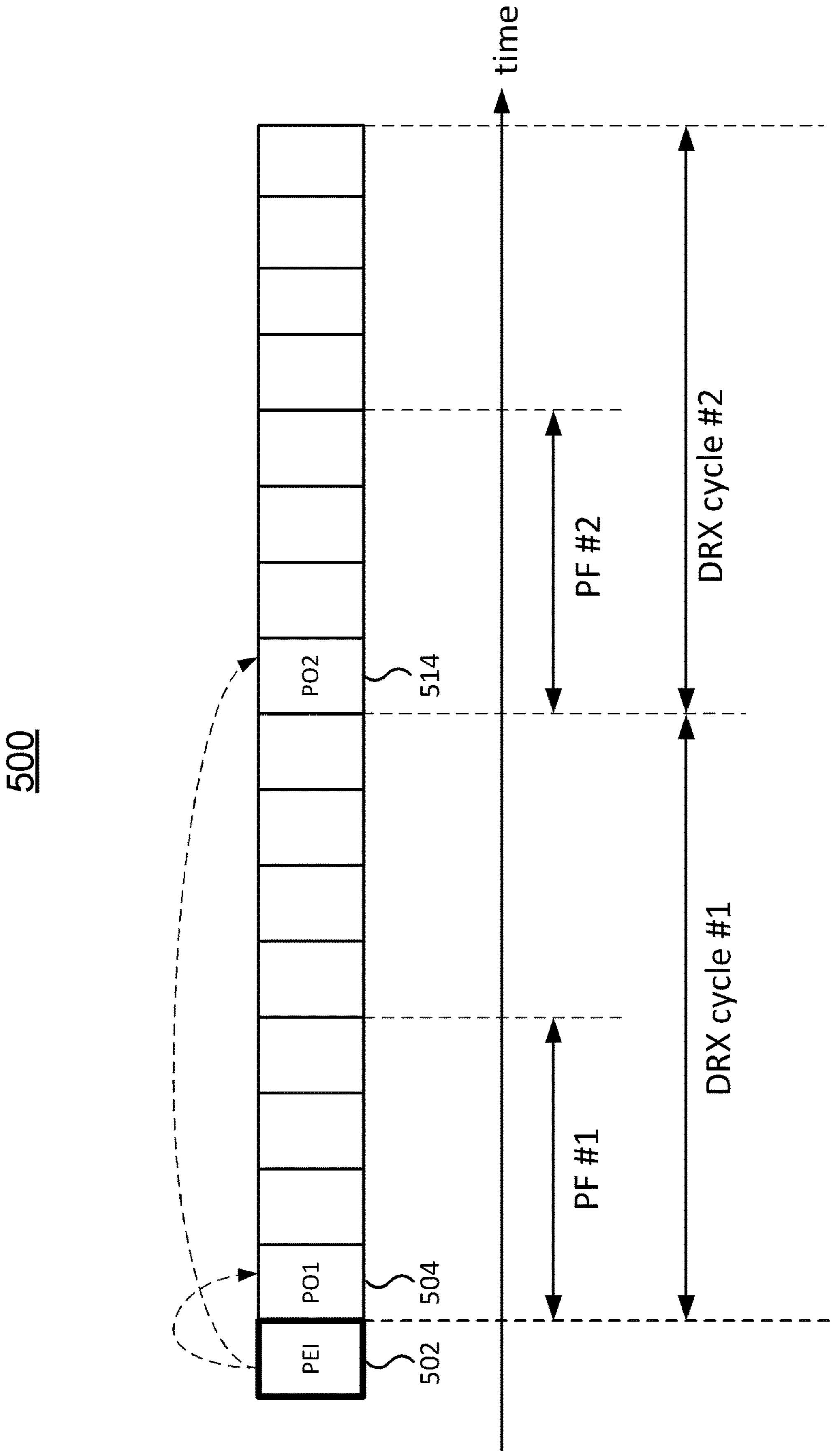
FIG. 5 illustrates a timing diagram of a new signaling/indication (e.g., PEI) associated with multiple POs/PFs/DRX cycles according to an example implementation of the present disclosure.

In one implementation, the instruction of one new signaling/indication (e.g., PEI) may be applied to multiple POs, PDCCH monitoring occasions for paging, PFs, and/or DRX cycles. In one implementation, the number of POs, PDCCH monitoring occasions for paging, PFs, and/or DRX cycles to be applied may be based on an explicit indication or an implicit indication. FIG. 5 illustrates a timing diagram 500 of a new signaling/indication (e.g., PEI) associated with multiple POs/PFs/DRX cycles according to an example implementation of the present disclosure. PEI 502 is associated with PO1 504 as well as PO2 514 (PF #1 as well as PF #2, or DRX cycle #1 as well as DRX #2). The UE may apply the instruction of the PEI 502 for the PO1 504 and the PO2 514 (PF #1 and PF #2, or DRX cycle #1 and DRX #2). The PEI 502 may indicate the number of POs/PFs/DRX cycles with which the PEI 502 is associated. According to the example illustrated in FIG. 5, the PEI 502 may indicate two POs/PFs/DRX cycles.

In one implementation, an explicit indication for the number of POs, PDCCH monitoring occasions for paging, PFs, and/or DRX cycles may be included in the new signaling/indication (e.g., PEI), such as using a field of DCI.

In one implementation, the number of POs, PDCCH monitoring occasions for paging, PFs, and/or DRX cycles may be configured via NAS signaling. The NAS signaling may be encapsulated into an RRC message. The RRC entity of the UE may receive the RRC message including NAS signaling and forward the NAS signaling to the NAS layer of the UE. Upon the reception of the NAS signaling, the NAS layer of the UE may obtain the information of the number of POs, PDCCH monitoring occasions for paging, PFs, and/or DRX cycles. The NAS layer of the UE may further forward the required RAN-level parameters (e.g., at least one of the information of the number of POs, PDCCH monitoring occasions for paging, PFs, and/or DRX cycles) to the RRC entity of the UE.

In one implementation, the number of POs, PDCCH monitoring occasions for paging, PFs, and/or DRX cycles may be configured via an RRC configuration (e.g., a configuration for the new signaling/indication (e.g., PEI)).

In one implementation, the number of POs, PDCCH monitoring occasions for paging, PFs, and/or DRX cycles may be configured via the system information.

In one implementation, the number of POs, PDCCH monitoring occasions for paging, PFs, and/or DRX cycles may be carried in the short message and/or the paging message.

In one implementation, when the UE receives the number of POs, PDCCH monitoring occasions for paging, PFs, and/or DRX cycles, the UE may store the value.

In one implementation, the UE may apply the instruction of one new signaling/indication (e.g., PEI) for one or multiple POs, PDCCH monitoring occasions for paging, PFs, and/or DRX cycles until the next monitoring occasion of the new signaling/indication (e.g., PEI).

In one implementation, the UE may apply the instruction of one new signaling/indication (e.g., PEI) for one or multiple POs, PDCCH monitoring occasions for paging, PFs, and/or DRX cycles until the next new signaling/indication (e.g., PEI) is received. Then the UE may apply the instruction of the next received new signaling/indication (e.g., PEI) accordingly.

In one implementation, the UE may apply the instruction of one new signaling/indication (e.g., PEI) for one or multiple POs, PDCCH monitoring occasions for paging, PFs, and/or DRX cycles until the end of the associated one or multiple POs, PDCCH monitoring occasions for paging, PFs and/or DRX cycles.

In one implementation, the UE may apply the instruction of one new signaling/indication (e.g., PEI) for one or multiple POs, PDCCH monitoring occasions for paging, PFs, and/or DRX cycles until the end of next K DRX cycle(s), where K is an integer. K may be pre-defined or pre-configured (e.g., via a dedicated signal or broadcast system information).

Validity of the New Signaling/Indication (e.g., PEI)

In one implementation, the instruction of one new signaling/indication (e.g., PEI) may be applied for a period of time. The UE may consider the instruction of the new signaling/indication (e.g., PEI) is valid during the period of time. The UE may consider the instruction of the new signaling/indication (e.g., PEI) is not valid after the period of time.

In one implementation, a validity timer may be configured for the UE. While the validity timer is running, the UE may consider the instruction of the new signaling/indication (e.g., PEI) is valid. While the validity timer is not running, the UE may consider the instruction of the new signaling/indication (e.g., PEI) is not valid.

Figure 6:
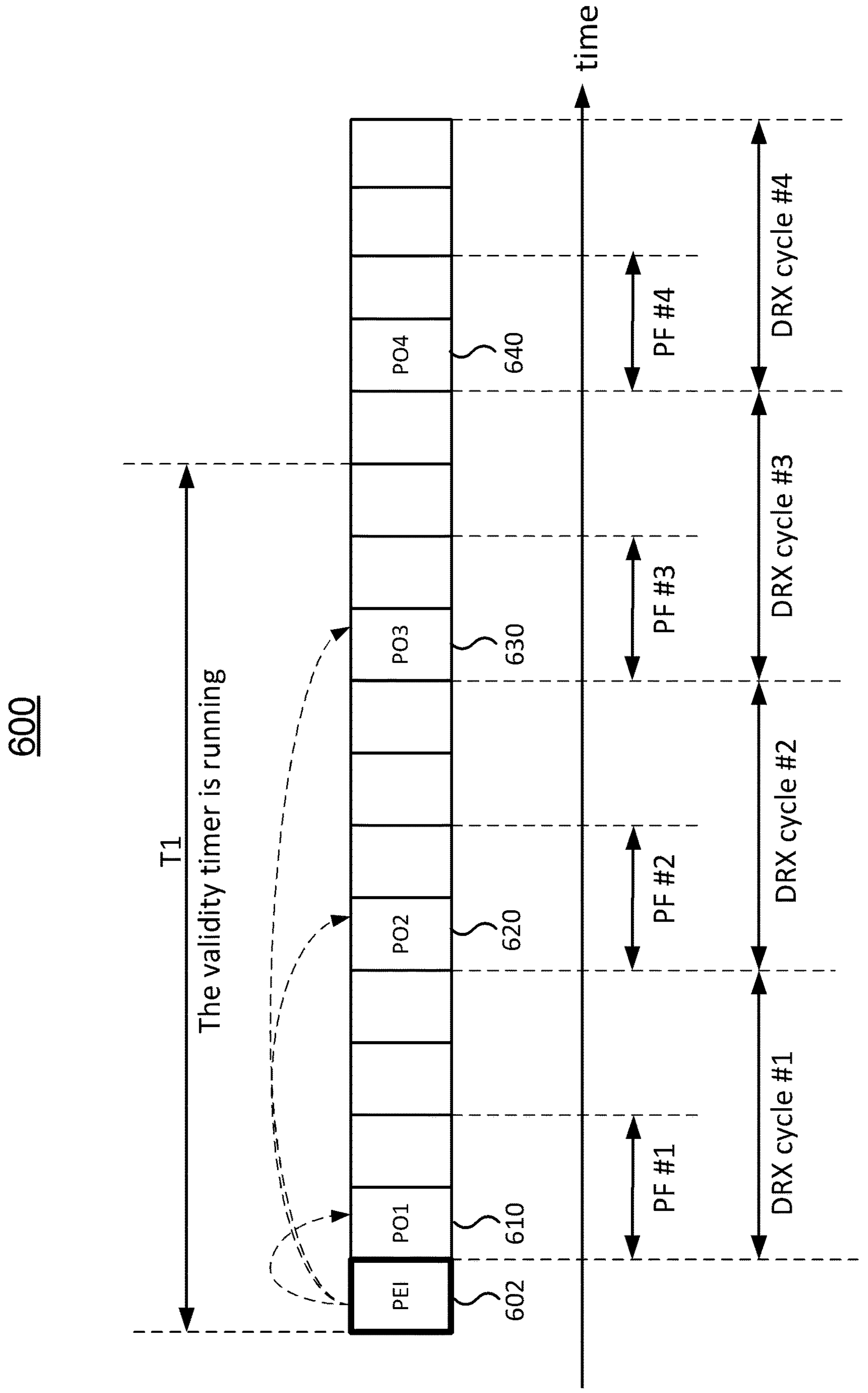
FIG. 6 illustrates a timing diagram of a new signaling/indication (e.g., PEI) associated with a validity timer according to an example implementation of the present disclosure.

FIG. 6 illustrates a timing diagram 600 of a new signaling/indication (e.g., PEI) associated with a validity timer according to an example implementation of the present disclosure. In one implementation, when the UE receives the new signaling/indication (e.g., PEI) 602, the UE may (re-)start the validity timer. While the validity timer is running in duration T1, the UE needs to monitor all the POs/PDCCH monitoring occasions for paging based on the instruction of the new signaling/indication (e.g., PEI) 602. Therefore, the UE may need to monitor the PO1 610, PO2 620, and PO3 630 while the validity timer is running if the new signaling/indication (e.g., PEI) 602 instructs the UE to monitor the POs. Since the validity timer is not running at PO4 640, the UE may or may not need to monitor the PO4 640, e.g., regardless of the instruction of the new signaling/indication (e.g., PEI) 602. On the other hand, the UE may not need to monitor the PO1 610, PO2 620, and PO3 630 while the validity timer is running if the new signaling/indication (e.g., PEI) indicates to the UE not to monitor the POs. Since the validity timer is not running at PO4 640, the UE may or may not need to monitor the PO4 640, e.g., regardless of the instruction of the new signaling/indication (e.g., PEI) 602. In one implementation, the UE may monitor the PO (e.g., by following the legacy PF/PO formula without considering the power saving approaches) that does not fall within the running time of the validity timer. In one implementation, whether the UE needs to monitor the PO that does not fall within the running time of the validity timer may be based on a default action (which may be pre-configured or pre-defined).

In one implementation, the value for the validity timer may be configured via an RRC configuration (e.g., a configuration for the new signaling/indication (e.g., PEI)).

In one implementation, the value for the validity timer may be configured via the system information.

In one implementation, the value for the validity timer may be carried in at least one of the paging DCI, the short message, and the paging message.

In one implementation, the value for the validity timer may be associated with the number of actual transmitted SSBs (e.g., determined according to ssb-PositionsInBurst in the SIB1).

In one implementation, if the validity timer is configured as infinity, the UE may always monitor the new signaling/indication (e.g., PEI) on the monitoring occasion of the new signaling/indication (e.g., PEI). In one implementation, if the validity timer is configured as zero or not configured (or not present), the UE may not monitor the new signaling/indication (e.g., PEI).

Power Saving Profile

In one implementation, the new signaling/indication may indicate the power saving profile (and/or parameters). The UE may apply the new power saving profile (and/or parameter) based on the instruction of the new signaling/indication (e.g., PEI). For example, an explicit indication for the power saving profile (and/or parameter) may be included in the new signaling/indication, e.g., such as using a field of DCI. In one implementation, the UE may be configured with multiple power saving profiles (and/or parameters), and each of the power saving profiles may be associated with an index. The new signaling/indication (e.g., PEI) may indicate an index for indicating one of the power saving profiles.

In one implementation, the serving cell (or gNB) may configure the UE with multiple power saving profiles. For example, the UE may be configured with a first power saving profile and a second power saving profile. The parameters in the first power saving profile may be the same as or different from the parameters in the second power saving profile. Each power saving profile may include a set of parameters for the UE to apply for, so that the UE (or the network) may operate in a power saving manner. The set of parameters in the power saving profile may include one or multiple of the DRX configuration (e.g., DRX-Config IE), paging-related configuration (e.g., PCCH-Config IE), PDCCH monitoring-related configuration (e.g., PDCCH-ConfigCommon), and/or any parameters required to configure the UE to operate in the power saving manner/mode.

The DRX configuration may include at least one of the following IEs (but is not limited thereto): DRX on duration timer (e.g., drx-onDurationTimer IE), DRX inactivity timer (e.g., drx-InactivityTimer IE), DRX HARQ RTT DL timer (e.g., drx-HARQ-RTT-TimerDL IE), DRX HARQ RTT UL timer (e.g., drx-HARQ-RTT-TimerUL IE), DRX DL retransmission timer (e.g., drx-RetransmissionTimerDL IE), DRX UL retransmission timer (e.g., drx-RetransmissionTimerUL IE), DRX long cycle start offset (e.g., drx-LongCycleStartOffset IE), DRX short cycle (e.g., drx-ShortCycle IE), DRX short cycle timer (e.g., drx-ShortCycle Timer IE), DRX slot offset (e.g., drx-SlotOffsetIE).

The paging-related configuration may include (but is not limited to) paging cycle (e.g., DRX cycle, defaultPagingCycle IE, ran-PagingCycle IE, PagingCycle IE), first PDCCH monitoring occasion for paging of each PO of the PF (e.g., firstPDCCH-MonitoringOccasionOfPO IE), an offset used by the UE to derive the number of total paging frames in the paging cycle (corresponding to parameter N used in PF/PO formula in the 3GPP TS 36.304) and paging frame offset (corresponding to parameter PF_offset used in PF/PO formula in the 3GPP TS 36.304) (e.g., nAndPagingFrameOffset IE), number of paging occasions per paging frame (e.g., ns IE), and the number of PDCCH monitoring occasions corresponding to an SSB for paging (e.g., nrofPDCCHMonitoringOccasionPerSSB IE).

The PDCCH-related configuration may include (but is not limited to) Control resource set, search space list, first PDCCH monitoring occasion of PO, paging search space, etc.

Number of Repetitions for New Signaling/Indication Monitoring

Figure 7:
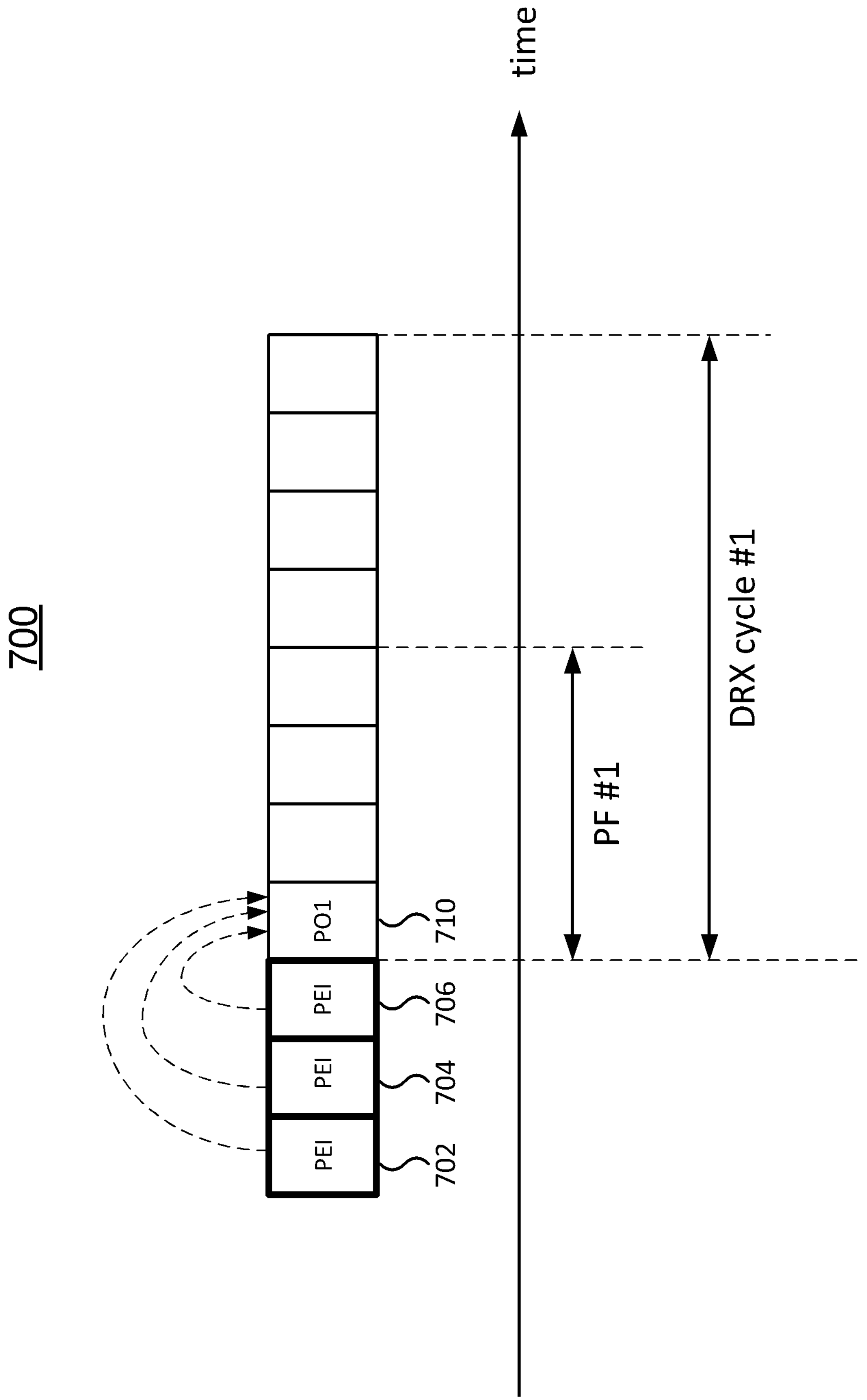
FIG. 7 illustrates a repetition mechanism for a new signaling/indication (e.g., PEI) according to an example implementation of the present disclosure.

FIG. 7 illustrates a repetition mechanism 700 for a new signaling/indication (e.g., PEI) according to an example implementation of the present disclosure. In one implementation, the NW may configure/indicate/repeat more than one new signaling/indication (e.g., PEI) to the UE, where the multiple new signaling/indications (e.g., PEI) may include the same information to indicate the same behavior for one PO, PDCCH monitoring occasion for paging, PF, and/or DRX cycle. As illustrated in FIG. 7, the NW may configure the number of repetitions for a PEI as three. The UE may receive PEI 702, PEI 704, and PEI 706, all of which may include the same instruction/information to be applied to PO1 710 (or PF #1, or DRX cycle #1).

In one implementation, the number of repetitions for the new signaling/indication (e.g., PEI) may indicate the number of the new signaling/indication (e.g., PEI) monitoring occasions that the UE should monitor for one PO, PDCCH monitoring occasion for paging, PF, and/or DRX cycle.

In one implementation, the number of repetitions for the new signaling/indication (e.g., PEI) may be (pre-)configured via an RRC configuration (e.g., a configuration for the new signaling/indication (e.g., PEI)).

In one implementation the number of repetitions for the new signaling/indication (e.g., PEI) may be (pre-)configured via the system information.

In one implementation, the number of repetitions for the new signaling/indication (e.g., PEI) may be carried in at least one of the paging DCI, the short message and/or paging message.

In one implementation, the number of repetitions for the new signaling/indication (e.g., PEI) may be associated with the number of actual transmitted SSBs (e.g., determined according to ssb-PositionsInBurst in the SIB1). For example, the UE may assume that each actual transmitted SSB may transmit a new signaling/indication (e.g., PEI).

In one implementation, the repeated new signaling/indications (e.g., PEI) may include the same information (e.g., same instruction) to indicate whether the UE should monitor the PDCCH for paging (on a paging occasion). The UE may receive the new signaling/indication (e.g., PEI) from a randomly selected actual transmitted SSB.

In one implementation, when the UE receives the number of repetitions for the new signaling/indication (e.g., PEI), the UE may store the value.

In one implementation, the UE may consider the reception of the new signaling/indication (e.g., PEI) as failed if no new signaling/indication (e.g., PEI) was successfully received on all monitoring occasions for the repetitions of the new signaling/indication (e.g., PEI).

In one implementation, the UE may consider the reception of the new signaling/indication (e.g., PEI) as successful if at least one of the new signaling/indication (e.g., PEI) repetitions was successfully received on the monitoring occasion for the repetitions of the new signaling/indication (e.g., PEI).

In one implementation, the UE may stop monitoring the repetitions of the new signaling/indication (e.g., PEI) if one of the new signaling/indication (e.g., PEI) repetitions was successfully received on the monitoring occasion for the repetitions of the new signaling/indication (e.g., PEI).

Prohibition for Monitoring the New Signaling/Indication (e.g., PEI)

In one implementation, the UE may be prohibited from monitoring the new signaling/indication (e.g., PEI) in some cases. The UE could not monitor the new signaling/indication (e.g., PEI) on the new signaling/indication (e.g., PEI) monitoring occasion.

In one implementation, a prohibit timer may be (pre-) configured for the UE. While the prohibit timer is running, the UE could not monitor the new signaling/indication (e.g., PEI). If the prohibit timer is not running, the UE could monitor the new signaling/indication (e.g., PEI).

The prohibit timer may be (re-)started when the UE enters RRC IDLE/INACTIVE state.

The prohibit timer may be stopped when the UE enters the RRC_CONNECTED state.

The prohibit timer may be (re-)started or stopped when the UE receives the RRC release (with/without suspend configuration) message.

The prohibit timer may be (re-)started or stopped when the UE receives the new signaling/indication (e.g., PEI).

The prohibit timer may be (re-)started or stopped when the UE receives paging (e.g., paging DCI, paging message).

The prohibit timer may be (re-)started or stopped when the UE receives the short message.

The prohibit timer may be (re-)started or stopped when the UE receives the system information.

The prohibit timer may be (re-)started or stopped when the UE receives the paging message and the UE ID field in the paging message matches the UE ID.

The prohibit timer may be (re-)started or stopped when the UE initiates an RA procedure and/or an RRC connection resume procedure.

In one implementation, the value of the prohibit timer may be (pre-)configured via an RRC configuration (e.g., a configuration for the new signaling/indication (e.g., PEI)).

In one implementation the value of the prohibit timer may be (pre-)configured via system information.

In one implementation, the value of the prohibit timer may be carried in the short message and/or the paging message.

In one implementation, the value of the prohibit timer may be associated with the number of actual transmitted SSBs (e.g., determined according to ssb-PositionsInBurst in the SIB1).

In one implementation, if the prohibit timer is (pre-)configured as infinity, the UE could not monitor the new signaling/indication (e.g., PEI) on the monitoring occasion of the new signaling/indication (e.g., PEI). In one implementation, if the prohibit timer is (pre-)configured as zero or not (pre-)configured, the UE may always monitor the new signaling/indication (e.g., PEI) on the monitoring occasion of the new signaling/indication (e.g., PEI).

In one implementation, an indication from NW may indicate whether the UE could monitor the new signaling/indication (e.g., PEI) on the new signaling/indication (e.g., PEI) monitoring occasion or not. The indication may be indicated via the new signaling/indication (e.g., PEI), short message, paging message, system information, RRC release (with suspend message), etc. The indication may be a flag (e.g., one bit) to indicate whether the UE could monitor the new signaling/indication (e.g., PEI) on the new signaling/indication (e.g., PEI) monitoring occasion or not.

In one implementation, if the UE is prohibited from monitoring the new signaling/indication (e.g., PEI) (e.g., based on the prohibit timer), the UE may need to monitor the PO(s) by default. In one implementation, if the UE is prohibited from monitoring the new signaling/indication (e.g., PEI) (e.g., based on the prohibit timer), whether the UE needs to monitor the PO(s) may be pre-configured or pre-defined.

Fallback Mechanism for New Signaling/Indication (e.g., PEI)

The UE may fail to monitor/receive/decode the new signaling/indication (e.g., PEI) on the new signaling/indication (e.g., PEI) monitoring occasion for a number of times or for a period of time, e.g., due to poor channel quality or collision of the new signaling/indication (e.g., PEI) monitoring occasion with other resources, etc. In one implementation, the UE may mis-detect the new signaling/indication (e.g., PEI) for a number of times or for a period of time. For example, the UE may fail to receive/detect the new signaling/indication (e.g., PEI) on the monitoring occasions of the new signaling/indication (e.g., PEI). That is, the UE may monitor the monitoring occasions of the new signaling/indication (e.g., PEI) but could not receive/detect the new signaling/indication (e.g., PEI).

In one implementation, the UE may maintain a counter to count how many times the UE fails to monitor/receive/decode the new signaling/indication (e.g., PEI) on the new signaling/indication (e.g., PEI) monitoring occasions. If the value of the counter reaches the maximum, the UE may perform one or more of the following fallback mechanisms.

In one implementation, the UE may maintain a timer to determine whether it could receive any new signaling/indication (e.g., PEI) on a new signaling/indication (e.g., PEI) monitoring occasion while the timer is running. The UE may (re-)start the timer when receiving the new signaling/indication (e.g., PEI) on a new signaling/indication (e.g., PEI) monitoring occasion. However, if the timer expires, the UE may perform one or more of the following fallback mechanisms.

If the UE could not monitor/receive/decode the new signaling/indication (e.g., PEI) on a new signaling/indication (e.g., PEI) monitoring occasion for a number of times or for a period of time, the UE may need to perform one or more of the following fallback mechanisms.

The UE should monitor each PO/PDCCH monitoring occasion (as R-15/R-16 behavior).

The UE initiates an RA procedure, RRC connection resume procedure, RRC connection establishment procedure, RRC connection re-establishment procedure, cell (re-)selection procedure, RNA update (e.g., T380 expires or triggered upon reception of SIB1), tracking area update, and/or etc.

The UE transmits a specific indication to inform the NW that there is a problem for the new signaling/indication (e.g., PEI) reception.

The UE moves to the RRC_IDLE state and/or informs the NAS.

In one implementation, the number or times (e.g., the maximum value of the counter) or the period of time (e.g., the initial value of the timer) may be (pre-)configured via NAS signaling.

In one implementation, the number or times (e.g., the maximum value of the counter) or the period of time (e.g., the initial value of the timer) may be (pre-)configured via an RRC configuration (e.g., a configuration for the new signaling/indication (e.g., PEI)).

In one implementation, the number or times (e.g., the maximum value of the counter) or the period of time (e.g., the initial value of the timer) may be (pre-)configured via the system information.

In one implementation, the number or times (e.g., the maximum value of the counter) or the period of time (e.g., the initial value of the timer) may be carried in the short message and/or the paging message.

UE Capability/UE Assistance Information for the New Signaling/Indication (e.g., PEI)

In one implementation, the UE may indicate to the NW whether it supports the new signaling/indication (e.g., PEI). For example, when the UE receives a UE capability enquiry from the NW, the UE may transmit the UE capability information to the NW.

The UE capability parameters may be associated with at least one of the configurations/parameters (for the new signaling/indication (e.g., PEI)) disclosed in the present disclosure, including:

Whether the new signaling/indication (e.g., PEI) is supported or not (and in which RRC state). Whether cell-specific/group-specific/UE-specific new signaling/indication (e.g., PEI) is supported or not.

Which UE group of the new signaling/indication (e.g., PEI) is supported.

Maximum/Minimum offset of the new signaling/indication (e.g., PEI).

Maximum/Minimum starting position of the new signaling/indication (e.g., PEI).

Maximum/Minimum gap between the new signaling/indication (e.g., PEI) and the PO, PDCCH monitoring occasion for paging, PF, and/or DRX cycle.

Maximum/Minimum duration of the new signaling/indication (e.g., PEI).

Maximum/Minimum number of the new signaling/indication (e.g., PEI) in a duration.

Maximum/Minimum periodicity of the new signaling/indication (e.g., PEI).

Maximum/Minimum PO, PDCCH monitoring occasion for paging, PF, and/or DRX cycle associated with one new signaling/indication (e.g., PEI).

Which power saving profile is supported.

Whether repetition for the new signaling/indication (e.g., PEI) monitoring is supported or not.

Maximum/Minimum number of repetitions for the new signaling/indication (e.g., PEI) monitoring.

In one implementation, the UE may indicate different UE capabilities (associated with a specific UE capability parameter) for TDD and FDD.

In one implementation, the UE may indicate different UE capabilities for FR1 and FR2.

In one implementation, the UE may indicate different UE capabilities for different RRC states.

In one implementation, the UE, with the support of the new signaling/indication, may be mandatorily required to reply with the UE capability information if the NW enquires the UE capability.

In one implementation, the UE may indicate the preference of the new signaling/indication via UE assistance information. The UE may initiate a procedure for transmitting the UE assistance information in some cases, e.g., upon being configured to provide the corresponding UE assistance information, upon change of its preference for the corresponding UE assistance information, etc.

The UE assistance information may be associated with at least one of the configurations/parameters (for the new signaling/indication) disclosed in the present disclosure, including:

Preferred UE group of the new signaling/indication

Preferred cell-specific/group-specific/UE-specific new signaling/indication

Preferred Maximum/Minimum offset of the new signaling/indication

Preferred Maximum/Minimum starting position of the new signaling/indication

Preferred Maximum/Minimum gap between the new signaling/indication and the PO, PDCCH monitoring occasion for paging, PF, and/or DRX cycle Preferred Maximum/Minimum duration of the new signaling/indication Preferred Maximum/Minimum number of the new signaling/indication in a duration Preferred Maximum/Minimum periodicity of the new signaling/indication Preferred Maximum/Minimum PO, PDCCH monitoring occasion for paging, PF, and/or DRX cycle associated with one new signaling/indication (e.g., PEI)

Preferred power saving profile

Preferred number of repetitions for the new signaling/indication

Figure 8:
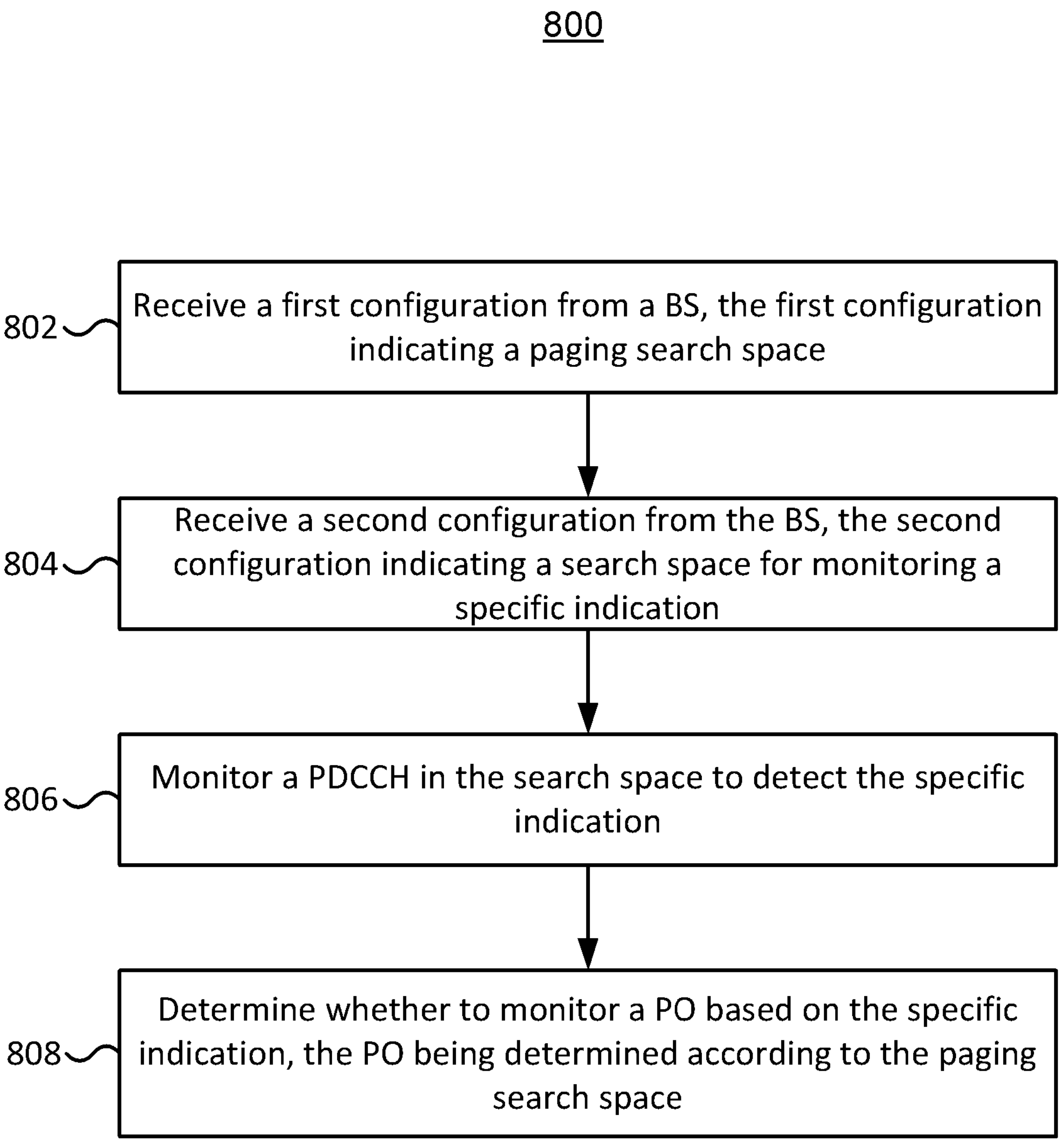
FIG. 8 illustrates a method performed by a UE for a power saving operation in one of an RRC_INACTIVE state and an RRC_IDLE state according to an example implementation of the present disclosure

Preferred Maximum/Minimum number of repetitions for the new signaling/indication monitoring FIG. 8 illustrates a method 800 performed by a UE for a power saving operation in one of an RRC_INACTIVE state and an RRC_IDLE state according to an example implementation of the present disclosure. In action 802, the UE receives a first configuration from a BS, the first configuration indicating a paging search space. The paging search space may include one or more POs. The PO may include one or more PDCCH monitoring occasions. In action 804, the UE receives a second configuration from the BS, the second configuration indicating a search space for monitoring a specific indication. The specific indication may be a paging early indication (PEI). The specific indication may not be the DCP or the WUS. The second configuration may be received via system information or an RRC release message. In action 806, the UE monitors a PDCCH in the search space (e.g., configured by the second configuration) to detect the specific indication. In action 808, the UE determines whether to monitor a PO based on the specific indication, the PO being determined according to the paging search space.

In one implementation, the UE may determine whether to monitor the PO based on whether the specific indication (e.g., PEI) is successfully detected in the search space in action 808. The UE may monitor the PO upon determining that the specific indication is successfully detected in the search space. The UE may skip monitoring the PO upon determining that the specific indication is not successfully detected in the search space.

In one implementation, the UE may determine whether to monitor the PO based on a value of the specific indication (e.g., PEI) in action 808. The UE may monitor the PO if the value of the specific indication is a first value. The UE may skip monitoring the PO if the value of the specific indication is a second value.

In one implementation, the specific indication (e.g., PEI) is detected before the PO. For example, the UE detects the specific indication at an offset before the PO. The offset may be configured in a configuration associated with the specific indication. The offset may be configured in a time unit, which may be one of a slot, a symbol, a subframe, a radio frame, a millisecond, and a second. The offset may be zero in one implementation.

In one implementation, the UE may be configured with a timer, and the search space for detecting the specific indication may be monitored while the timer is running. The (initial) value of the timer may be configured in a time unit, which may be one of a slot, a symbol, a subframe, a radio frame, a millisecond, and a second. The value of the timer may be configured as infinity in one implementation.

In one implementation, the specific indication may indicate a UE group. The specific indication may be a UE group-specific signaling. The UE may determine whether to monitor the PO according to whether the UE is associated with the UE group in action 808 illustrated in FIG. 8. The UE group may be formed based on at least one of a UE ID and UE assistance information.

In one implementation, the UE may monitor one or multiple PDCCH monitoring occasions in the search space to detect the specific indication according to a number of SSBs transmitted by the BS. The number of SSBs transmitted by the BS may be determined according to ssb-PositionsInBurst in the SIB 1. In one implementation, the number of SSBs transmitted by the BS may be associated with the number of the times the specific indication is repeated in a duration.

Figure 9:
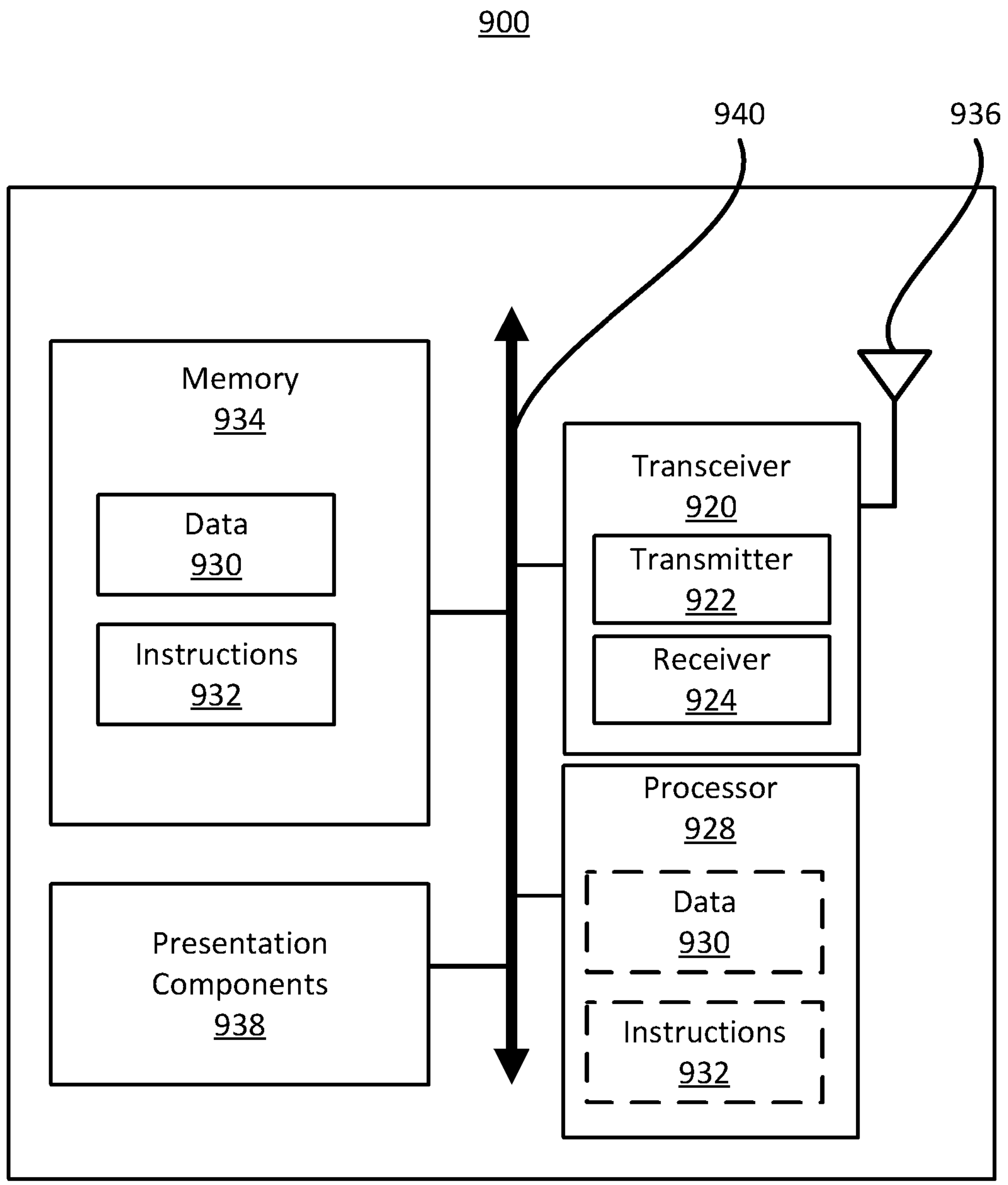
FIG. 9 is a block diagram illustrating a node for wireless communication according to an example implementation of the present disclosure.

FIG. 9 is a block diagram illustrating a node 900 for wireless communication according to an example implementation of the present disclosure. As illustrated in FIG. 9, the node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including but not limited to usable, non-usable, and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules, or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage, or other magnetic storage devices. Computer storage media may not include a propagated data signal. Communication media may typically embody computer-readable instructions, data structures, program modules, or other data in a modulated data signal, such as a carrier wave, or other transport mechanism and include any information delivery media.

The term "modulated data signal" means a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store computer-readable, computer-executable instructions 932 (e.g., software codes) that are configured to cause the processor 928 to perform various functions disclosed herein, for example, with reference to FIGS. 1 through 8. Alternatively, the instructions 932 may not be directly executable by the processor 928 but may be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the instructions 932 received from the memory 934, and information transmitted and received via the transceiver 920, the baseband communications module, and/or the network communications module. The processor 928 may also process information to be sent to the transceiver 920 for transmission via the antenna 936 to the network communications module for transmission to a core network.

One or more presentation components 938 may present data indications to a person or another device. Examples of presentation components 938 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed, and many rearrangements, modifications, and substitutions are possible without departing from the scope of the present disclosure.

What is claimed is:

1. A method performed by a user equipment (UE) for a power saving operation in one of a radio resource control (RRC)_INACTIVE state or an RRC_IDLE state, the method comprising:

receiving a first configuration from a base station (BS), the first configuration indicating a paging search space;

determining a paging occasion (PO) based on the paging search space;

receiving a second configuration from the BS, the second configuration being different from the first configuration and indicating a first search space for monitoring a specific indication that indicates, to the UE, whether to monitor the PO, the first search space being different from the paging search space;

monitoring a physical downlink control channel (PDCCH) in the first search space to detect the specific indication, the specific indication further indicating a UE group;

determining whether to monitor the PO based on whether the specific indication is detected in the first search space and whether the UE is associated with the UE group;

monitoring the PO in response to determining that the specific indication is successfully detected in the first search space and that the UE is associated with the UE group; and skipping monitoring the PO in response to determining that the specific indication is not successfully detected in the first search space or the UE is not associated with the UE group.

2. The method of claim 1, wherein the specific indication is detected before the PO in time domain.

3. The method of claim 1, wherein the first search space is monitored while a timer is running.

4. The method of claim 1, wherein the UE group is formed based on at least one of a UE identifier (ID) or UE assistance information.

5. The method of claim 1, wherein the second configuration is received via one of system information or an RRC release message.

6. The method of claim 1, wherein:

monitoring the PDCCH in the first search space comprises monitoring one or more PDCCH monitoring occasions in the first search space to detect the specific indication according to a number of Synchronization Signal Blocks (SSBs) transmitted by the BS.

7. A user equipment (UE) for performing a power saving operation in one of a radio resource control (RRC)_INACTIVE state or an RRC_IDLE state, the UE comprising:

at least one processor; and at least one non-transitory computer-readable medium coupled to the at least one processor and storing one or more computer-executable instructions that, when executed by the at least one processor, cause the UE to:

receive a first configuration from a base station (BS), the first configuration indicating a paging search space;

determine a paging occasion (PO) based on the paging search space;

receive a second configuration from the BS, the second configuration being different from the first configuration and indicating a first search space for monitoring a specific indication that indicates, to the UE, whether to monitor the PO, the first search space being different from the paging search space;

monitor a physical downlink control channel (PDCCH) in the first search space to detect the specific indication, the specific indication further indicating a UE group;

determine whether to monitor the PO based on whether the specific indication is detected in the first search space and whether the UE is associated with the UE group;

monitor the PO in response to determining that the specific indication is successfully detected in the first search space and that the UE is associated with the UE group; and skip monitoring the PO in response to determining that the specific indication is not successfully detected in the first search space or the UE is not associated with the UE group.

8. The UE of claim 7, wherein the specific indication is detected before the PO in time domain.

9. The UE of claim 7, wherein the first search space is monitored while a timer is running.

10. The UE of claim 7, wherein the UE group is formed based on at least one of a UE identifier (ID) or UE assistance information.

11. The UE of claim 7, wherein the second configuration is received via one of system information or an RRC release message.

12. The UE of claim 7, wherein:

monitoring the PDCCH in the first search space comprises monitoring one or more PDCCH monitoring occasions in the first search space to detect the specific indication according to a number of Synchronization Signal Blocks (SSBs) transmitted by the BS.

* * * * *